United States Patent
Choi et al.

(10) Patent No.: US 10,562,617 B2
(45) Date of Patent: Feb. 18, 2020

(54) ROTOR HUB VIBRATION ATTENUATOR

(71) Applicant: Bell Helicopter Textron, Inc., Fort Worth, TX (US)

(72) Inventors: Jouyoung Jason Choi, Southlake, TX (US); David Heverly, Arlington, TX (US); Michael Seifert, Southlake, TX (US); Michael Smith, Colleyville, TX (US); Frank Brad Stamps, Colleyville, TX (US); Thomas Parham, Jr., Colleyville, TX (US); Amarjit Olenchery Kizhakkepat, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 554 days.

(21) Appl. No.: 15/350,073

(22) Filed: Nov. 13, 2016

(65) Prior Publication Data

US 2017/0259911 A1 Sep. 14, 2017

Related U.S. Application Data

(60) Provisional application No. 62/308,012, filed on Mar. 14, 2016.

(51) Int. Cl.
*B64C 27/00* (2006.01)
*B64C 29/00* (2006.01)

(52) U.S. Cl.
CPC ........ *B64C 27/001* (2013.01); *B64C 29/0033* (2013.01); *B64C 2027/003* (2013.01)

(58) Field of Classification Search
CPC .............. B64C 27/001; B64C 29/0033; B64C 2027/003; B64C 2027/005; B64C 11/008
See application file for complete search history.

(56) References Cited

U.S. PATENT DOCUMENTS 3,219,120 A 11/1965 Hooper
4,403,681 A 9/1983 Desjardins
(Continued)

FOREIGN PATENT DOCUMENTS

WO 2011137417 A2 3/2011
WO 2014113114 A2 7/2014
(Continued)

OTHER PUBLICATIONS

International Search Report in related PCT Application No. PCT/US2017/022380 dated Nov. 21, 2017, 5 pages.
(Continued)

*Primary Examiner* — Dwayne J White
*Assistant Examiner* — Jackson N Gillenwaters
(74) *Attorney, Agent, or Firm* — Lightfoot & Alford PLLC

(57) ABSTRACT

A vibration attenuation system for attenuating vibrations in a mast of an aircraft includes a weight attached to the mast but free to orbit about the mast. The weight can be comprised of one or more weight assemblies. Embodiments can include a single weight, or plural weight assemblies wherein each weight assembly can include a mechanical interconnecting mechanism so that each weight assembly receives feedback regarding the position and movement of one or more other weight assemblies. Each weight can be associated with a spring that urges the weight towards a neutral position. Rotation of the mast can cause the weight to orbit about the mast and self-excite such that the weight acts against the urging of the spring towards an attenuating position.

13 Claims, 24 Drawing Sheets

(56) References Cited

U.S. PATENT DOCUMENTS

| | | |
|---|---|---|
| 5,456,341 A | 10/1995 | Gamjost et al. |
| 5,647,726 A | 7/1997 | Sehgal et al. |
| 6,045,090 A | 4/2000 | Krysinsky et al. |
| 7,118,328 B2 | 10/2006 | Welsh et al. |
| 7,448,854 B2 | 11/2008 | Jolly et al. |
| 7,942,633 B2 | 5/2011 | Jolly et al. |
| 8,021,115 B2 | 9/2011 | Welsh |
| 8,162,606 B2 | 4/2012 | Jolly et al. |
| 8,267,652 B2 | 9/2012 | Jolly et al. |
| 8,313,296 B2 | 11/2012 | Jolly et al. |
| 8,403,643 B2 | 3/2013 | Welsh |
| 8,435,002 B2 | 5/2013 | Jolly et al. |
| 8,454,315 B2 | 6/2013 | Welsh |
| 8,474,745 B2 | 7/2013 | Popelka et al. |
| 9,073,627 B2 | 7/2015 | Jolly et al. |
| 9,139,296 B2 | 9/2015 | Popelka et al. |
| 2006/0222505 A1 | 10/2006 | Sehgal et al. |
| 2011/0268573 A1* | 11/2011 | Girard .................. B64C 27/001 416/145 |
| 2014/0360830 A1* | 12/2014 | Heverly ................ B64C 27/001 188/378 |
| 2015/0203196 A1 | 7/2015 | Heverly, II et al. |

FOREIGN PATENT DOCUMENTS

| | | |
|---|---|---|
| WO | 2015031768 A1 | 3/2015 |
| WO | 2015031826 A1 | 3/2015 |

OTHER PUBLICATIONS

Written Opinion in related PCT Application No. PCT/US2017/0022380 dated Nov. 21, 2017, 2 pages.

European Search Report in related European Application No. 17807149.4 dated Mar. 1, 2019, 4 pages.

European Exam Report in related European Application No. 17807149.4 dated Mar. 14, 2019, 8 pages.

* cited by examiner

ROTOR HUB VIBRATION ATTENUATOR

TECHNICAL FIELD

The present disclosure relates to a vibration attenuator for a rotor hub.

DESCRIPTION OF RELATED ART

Rotary-wing aircraft, such as helicopters and tiltrotors, have at least one rotor for providing lift and propulsion forces, and these rotors have at least two airfoil blades connected to a rotatable hub. The rotor blades cause vibrations that are a function of the rotational speed of the rotor, and aircraft designers have difficulty accurately predicting the exact vibration modes that a particular rotor configuration will encounter. The vibrations can be transmitted through the rotor mast, through associated powertrain components, and into the airframe of the aircraft. The vibrations can reduce the life of affected components and cause undesirable vibrations for passengers. Various types of vibration attenuation systems have been developed to reduce or eliminate these vibrations. The conventional systems can include airframe-mounted vibration attenuators and at least one mast-mounted system.

Prior active and passive systems act at a specific point on the airframe to reduce vibrations, and this can result in amplified vibrations in other locations on the airframe. However, a passive mast-mounted rotating balancer for vibration reduction was disclosed in U.S. Pat. No. 3,219,120 and in an American Helicopter Society paper entitled, "UREKA-A Vibration Balancing Device for Helicopters" (January 1966, Vol. 11, No. 1). The UREKA (Universal Rotor Excitation Kinematic Absorber) device uses heavy rollers which revolve in a circular steel track to create an oscillatory force to minimize vibration. The rollers are free to rotate and position themselves relative to the position of the rotor, and the rollers will automatically achieve the correct position to minimize vibration if the mast attachment point possesses specific dynamic characteristics. However, the UREKA system only prevents an imbalance of the rotor at the 1/rev frequency and does not oppose other rotor-induced n/rev vibrations. The dynamic characteristics necessary for proper operation of the prior art is basically that of a supercritical shaft. If the mast attachment point does not possess these characteristics, then the UREKA device could amplify vibration rather than attenuate it and will not respond to n/rev vibrations where n is greater than 1. In addition, since the position of the rollers is governed by the motion of the mast attachment point, the device is susceptible to gusts and other transients that may disturb the roller position, creating a vibration transient.

For application to tiltrotors, where large changes in gross weight and rotor rotational speed are present, the UREKA device may not function properly, as the dynamic characteristics of the mast attachment point would vary considerably. The V-22 tiltrotor, for example, has dynamic characteristics which prevent the use of the UREKA design.

Although great strides have been made in the art of vibration attenuators for rotor hubs, significant shortcomings remain. Hub shear pendulums have been used but they are heavy and only attenuate approximately 50% of the n/rev vibration that they are tuned to cancel.

BRIEF DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DETAILED DESCRIPTION

Figure 1:
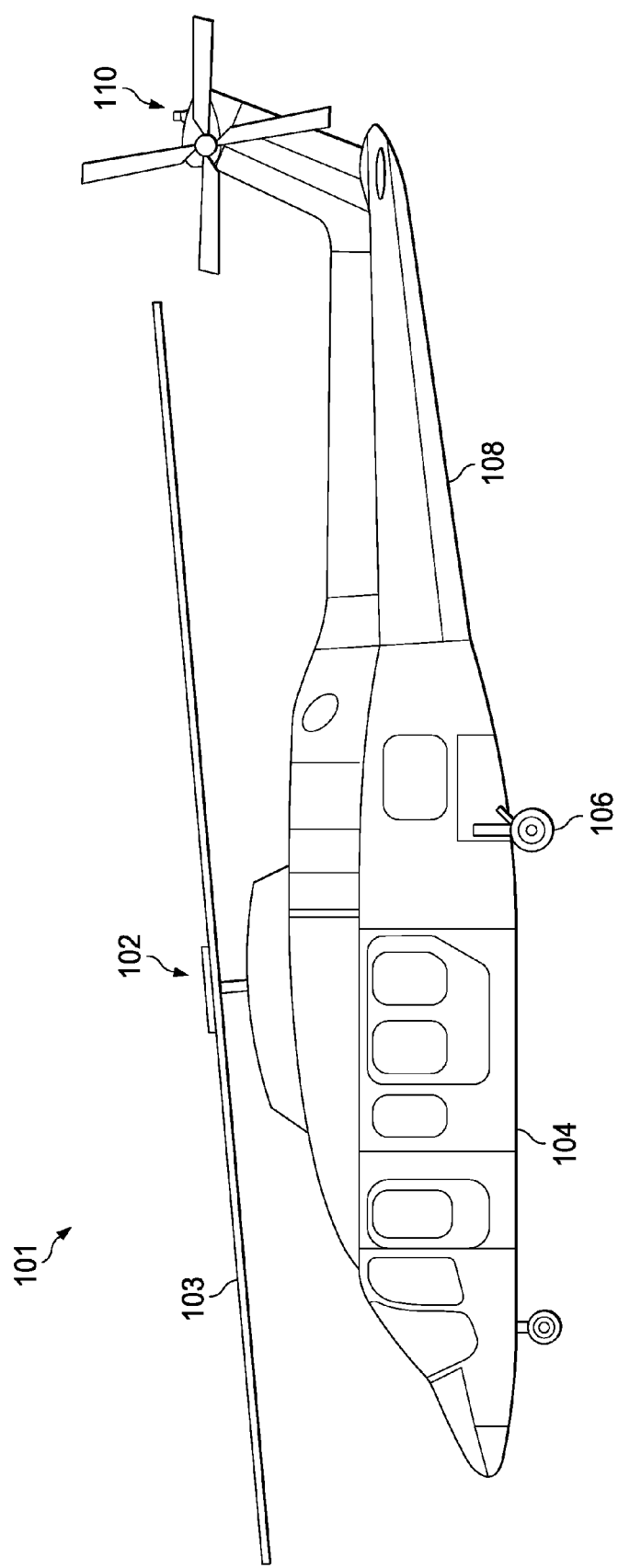
FIG. 1 shows a view of an aircraft having a vibration attenuation system according to the present disclosure.

Illustrative embodiments of the system and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The vibration attenuator system disclosed herein includes a rotorcraft hub-mounted vibration-reduction device with revolving spring mass(es) that represents an improvement over traditional hub Frahm, hub pendulum, or active spinning mass vibration devices. The disclosed vibration attenuator system has a base frame that is attached to a hub supporting one or more springs that, in turn, connect to a central mass. That collection of parts revolves with the hub. The centrally located mass moves in a plane containing its center of gravity and is normal to the mast center line. The mass moves in a circular path that varies in radius proportionally with the N/REV vibration magnitude and is phased 180 degrees from the said N/REV vibration, and counteracts the hub vibration. The mass orbits at N/REV, which is a higher rotational frequency than the 1/REV motion of the base frame, resulting in a steady extension or contraction motion in the spring length in response to any changes in the magnitude of the steady state N/REV Hub vibrations. The Hub vibrations maintain an approximately steady state magnitude and phase that is only affected by changes in the flight path of the aircraft. The disclosed vibration attenuator system includes a set of bearings between the base frame and the spring(s), which allows the spring(s) to rotate along with the mass, while maintaining the same tuning and physical function and changes the approximately steady state spring deformations to spring motions. Changing the spring deformations allows the weight to greatly change the operating radius of the mass which allows for a much greater force output with the same spring design.

Advantageously, unlike prior vibration attenuation systems, embodiments of the disclosed vibration attenuator system provides for vibration attenuation without the need for springs that are attached on one end to a moving weight and on the other end attached to a stationary frame that does not rotate relative to the mast.

Referring now to FIG. 1 in the drawings, a rotorcraft 101 is illustrated. Rotorcraft 101 has a rotor system 102 with a plurality of rotor blades 103. The pitch of each rotor blade 103 can be selectively controlled in order to selectively control direction, thrust, and lift of rotorcraft 101. Rotorcraft 101 further includes a fuselage 104, a landing gear system 106, an empennage 108, and an anti-torque system 110. Rotorcraft 101 can also include a vibration attenuator system as described further herein.

Figure 2:
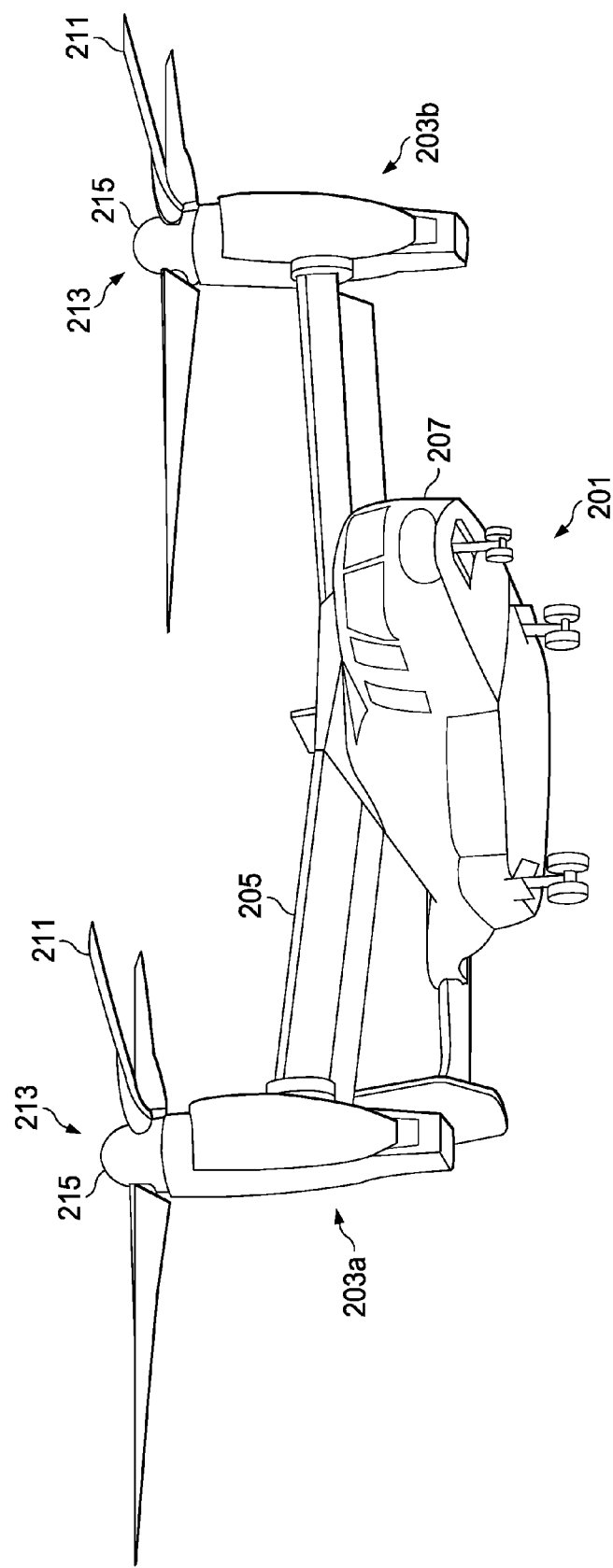
FIG. 2 shows a view of a tiltrotor aircraft having a vibration attenuation system according to the present disclosure.

FIG. 2 shows an oblique view of a rotorcraft 201 having a vibration attenuator system, which is described further herein. Rotorcraft 201 is a rotary-wing aircraft, specifically a tiltrotor aircraft, having a fuselage 207 and wings 205 extending from fuselage 207. Fuselage 207 and wings 205 comprise the airframe of aircraft 201. Rotatable nacelles 203a and 203b are located at the outer end of each wing 205 for housing an engine (not shown), and each engine is configured for providing torque to cause rotation of an attached proprotor assembly 213. Each proprotor assembly 213 has a plurality of rotor blades 211, which are connected to a hub located beneath an aerodynamic fairing, referred to as a spinner 215.

It should be appreciated that rotorcraft 101 and 201 are merely illustrative of a variety of aircraft that can implement the embodiments of the vibration attenuator systems disclosed herein. Other aircraft implementations can include hybrid aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices may also implement the embodiments.

Figure 3:
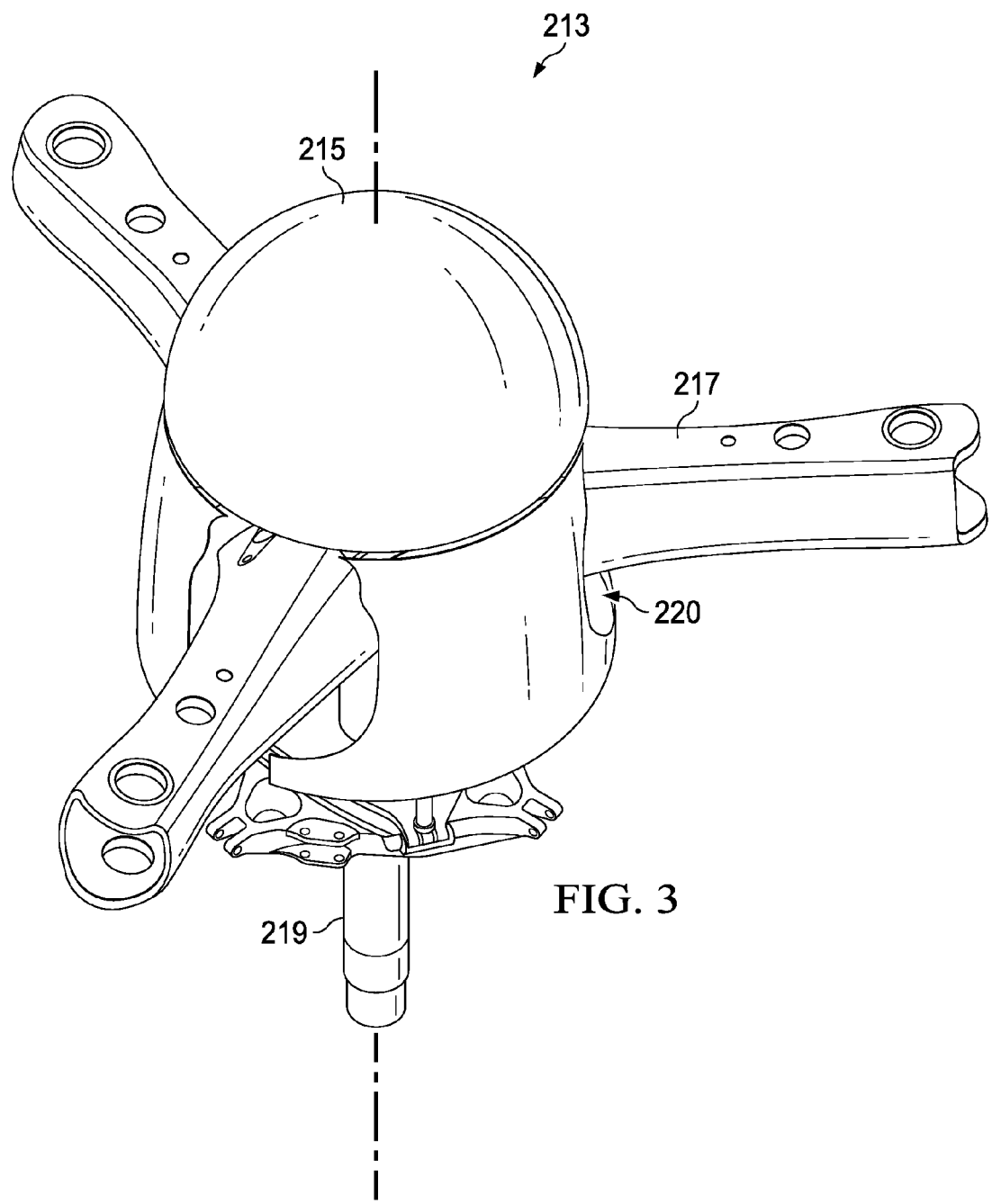
FIG. 3 shows an isolated, oblique view of a portion of a proprotor assembly that includes a vibration attenuation system according to the present disclosure.

FIG. 3 is an isolated, oblique view of a portion of a proprotor assembly 213. The proprotor assembly 213 comprises a grip and yoke assembly 217 for securing rotor blades 211 (shown in FIG. 2) to a mast 219. Holes 220 are formed in spinner 215 for allowing portions of the yoke assembly 217 to protrude for attachment of blades 211. The mast 219 is connected to an output of the engine (not shown) for transfer of torque from the engine to mast 219.

Figure 4:
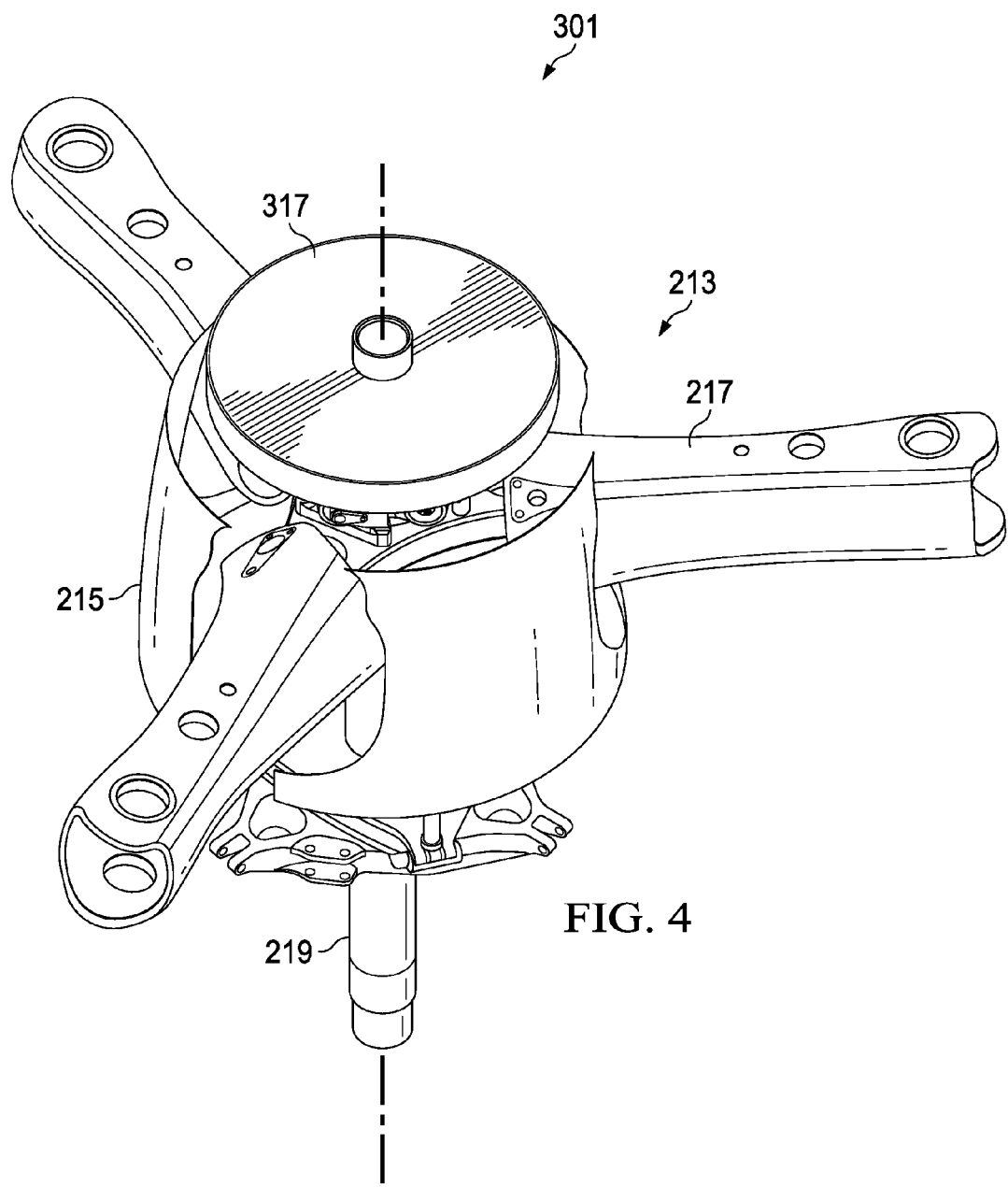
FIG. 4 shows the vibration attenuation system shown in FIG. 3, but with a cut-away view of the spinner.
Figure 5:
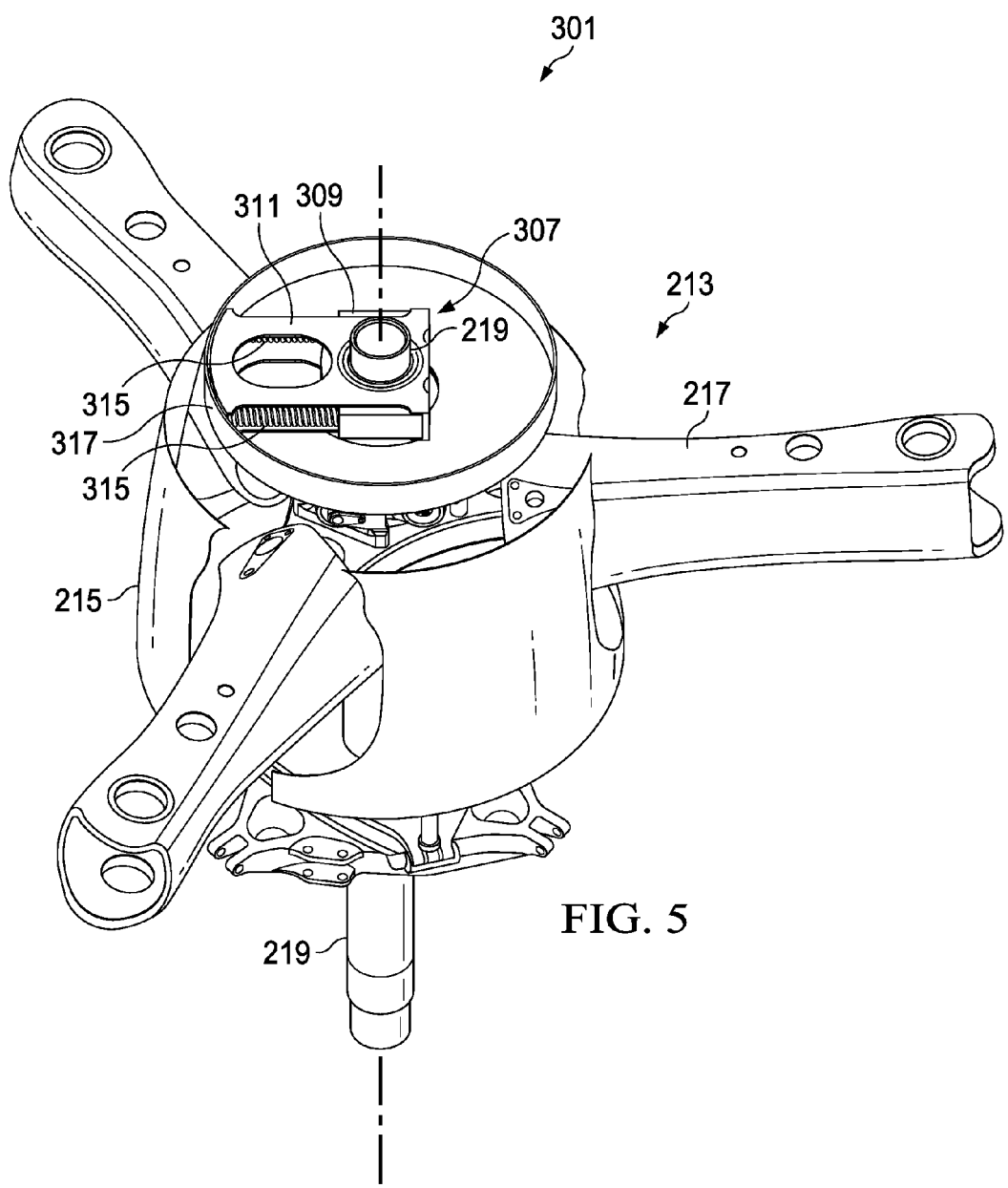
FIG. 5 shows the vibration attenuation system shown in FIG. 3, but with a cut-away view of the spinner and a cut-away view of the vibration attenuation assembly.

Referring now also to FIGS. 4 and 5, FIG. 4 shows the proprotor assembly 213 with a cut-away view of the spinner 215, and FIG. 5 shows the proprotor assembly 213 with a cut-away view of the spinner 215 and a cut-away view of the vibration attenuation assembly 301. As shown in FIG. 4, the vibration attenuation assembly 301 is connected to the mast 219 for rotation with the mast 219 and grip and yoke assembly 217. In the configuration shown, vibration attenuation assembly 301 is carried on an end portion of mast 219.

As shown in FIG. 5, the vibration attenuation assembly 301 comprises an adjustable weight assembly 307, which is configured to rotate relative to mast 219 about the longitudinal axis of mast 219. Weight assembly 307 has at least one weight 309 that is movably attached to weight support 311 for positioning the weight radially to the mast center line along tracks 313 (best shown in FIGS. 8-10) during operation of proprotor 213. This configuration allows for weight 309 to move to any position between an inner radial position, which provides for minimal or no shear forces as weight 309 spins, and an outer position, which provides for maximum shear forces. Compression springs 315 extend along respective tracks 313 and urge the weight 309 away from an outer radial region of the vibration attenuation assembly 301 and towards the mast 219. Springs 315 are selected to allow for self-excitation of the weight 309 at a desired N/REV frequency, resulting in the weight 309 self-positioning between the inner and outer positions in order to counteract the magnitude of the N/REV vibrations of the mast 219.

Figure 6:
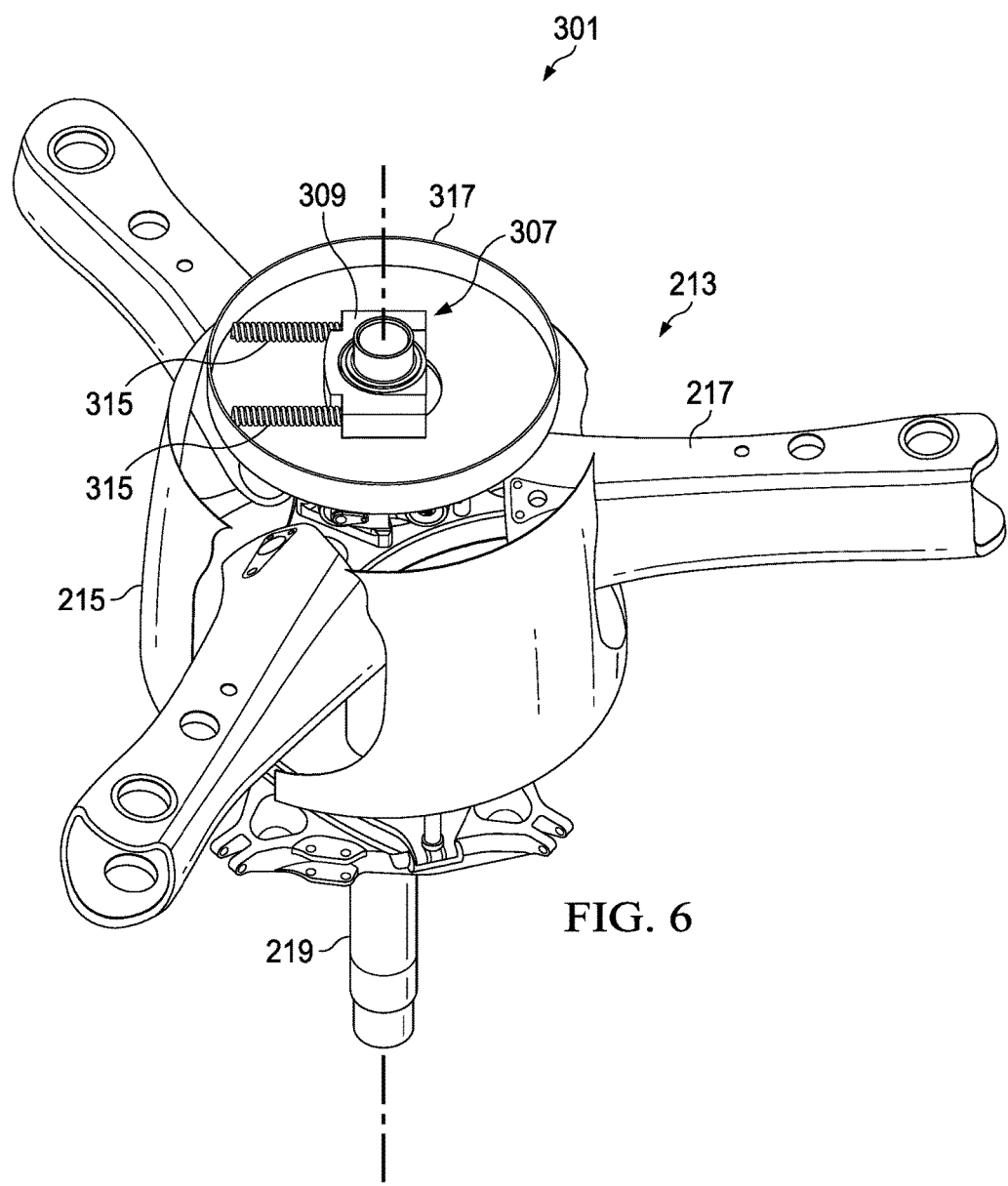
FIG. 6 shows the vibration attenuation system shown in FIG. 3, but with a cut-away view of the spinner and without components of the vibration attenuation assembly for clarity.
Figure 9:
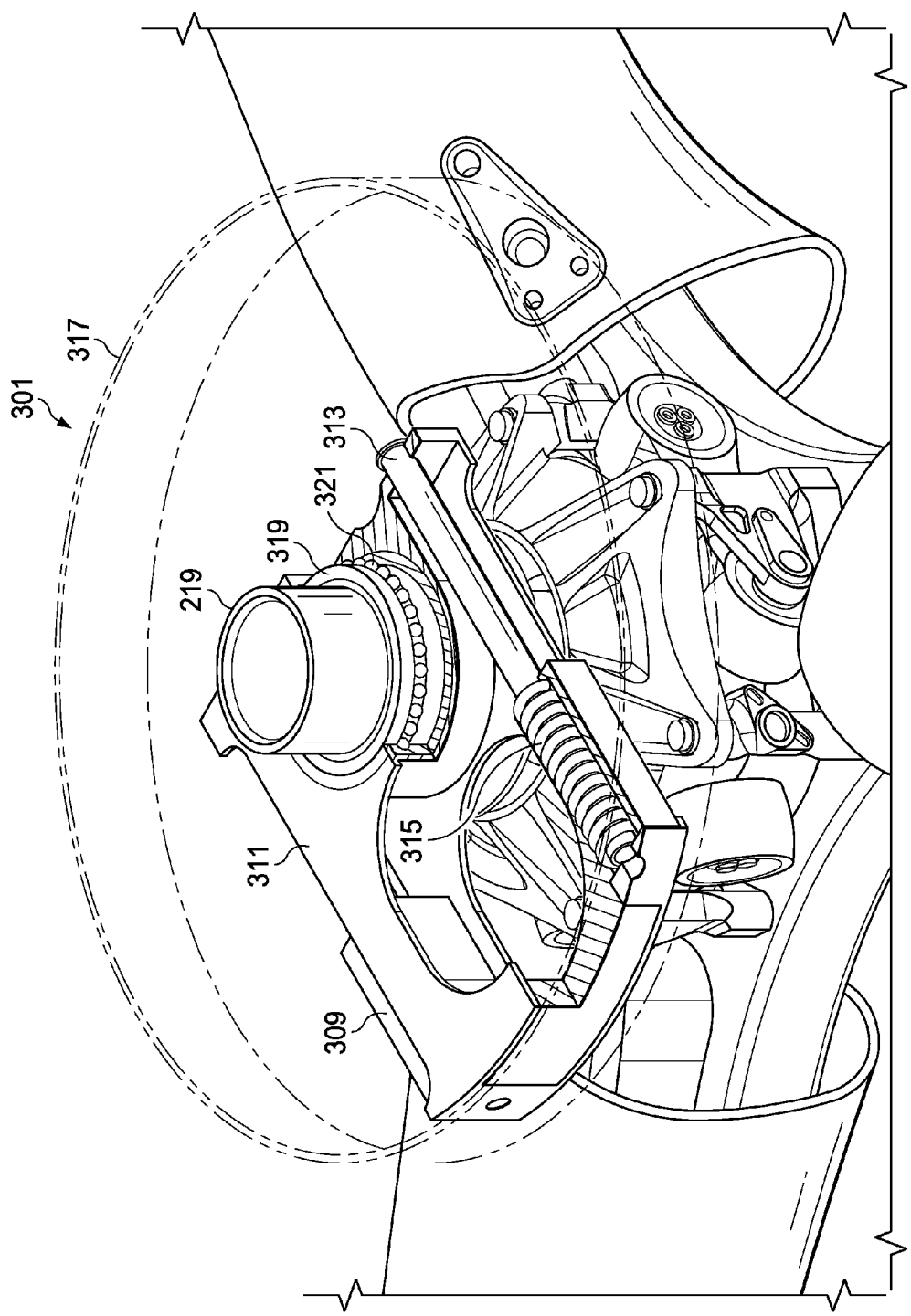
FIGS. 9 and 10 show enlarged views of the vibration attenuation system shown in FIG. 3, but with portions of components thereof removed for clarity and with the weight thereof at an outer position.
Figure 10:
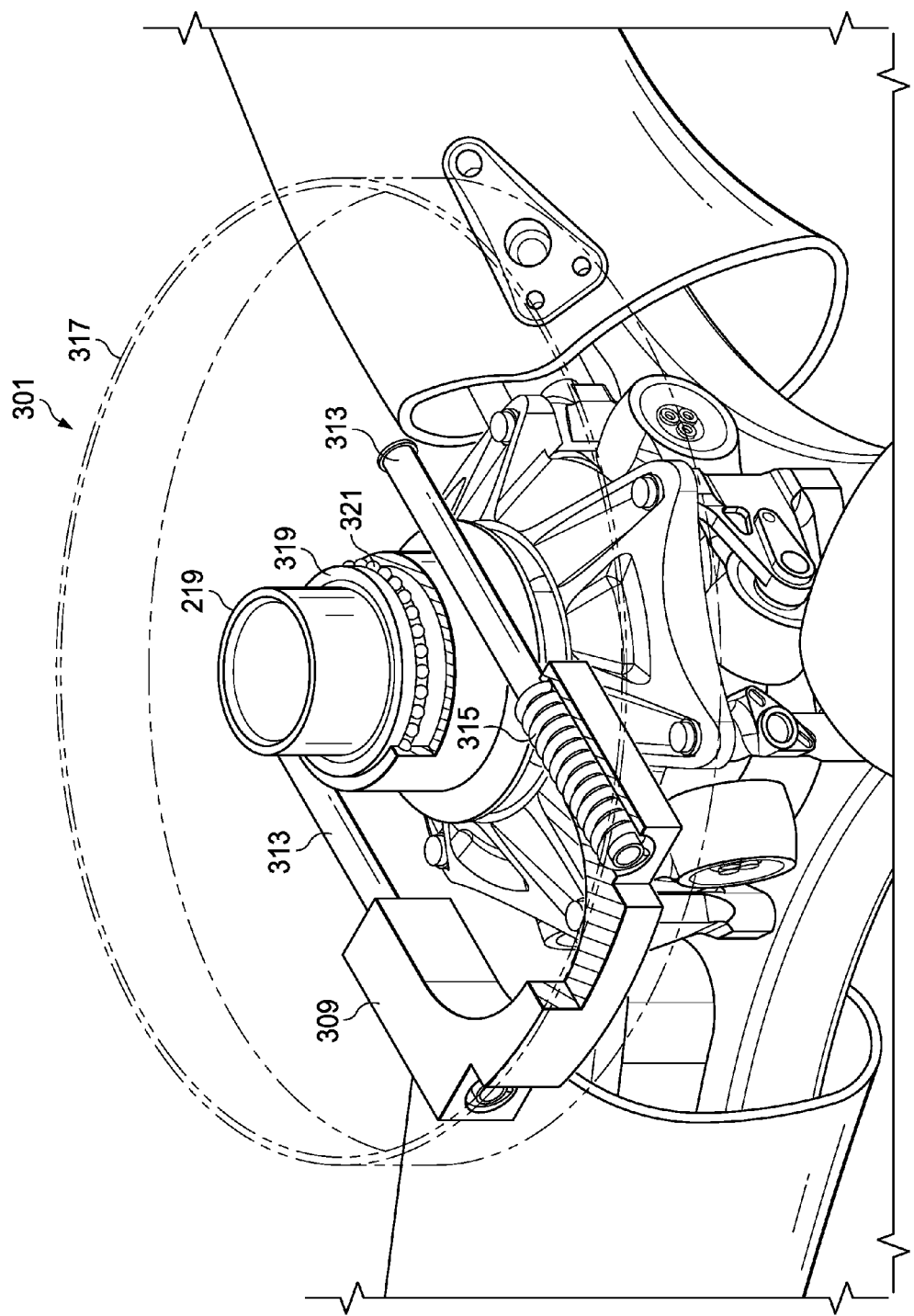
Figure 11:
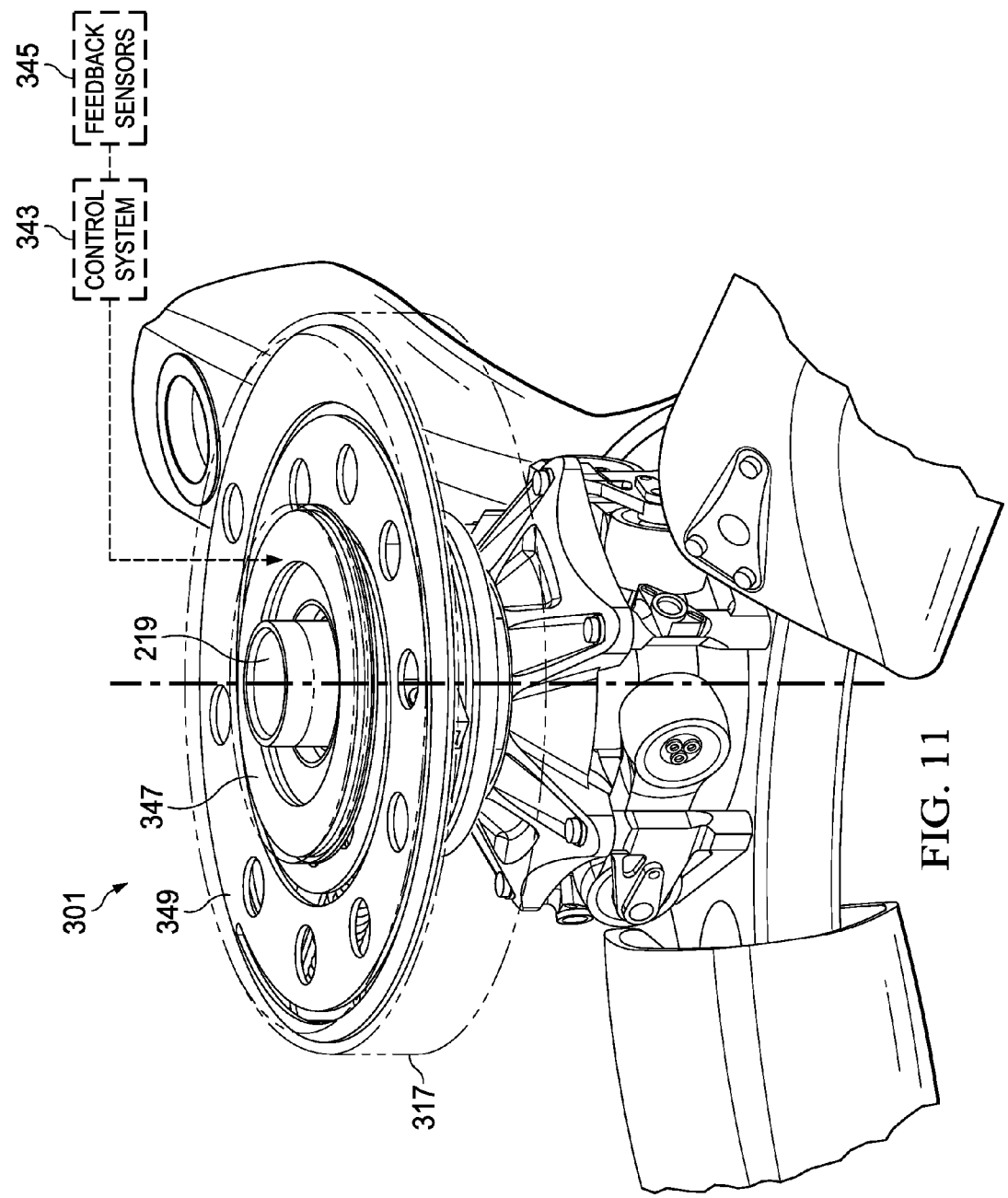
FIG. 11 shows an isolated, upper-perspective view of a portion of a proprotor assembly that includes an alternative embodiment of a vibration attenuation system according to the present disclosure.
Figure 12:
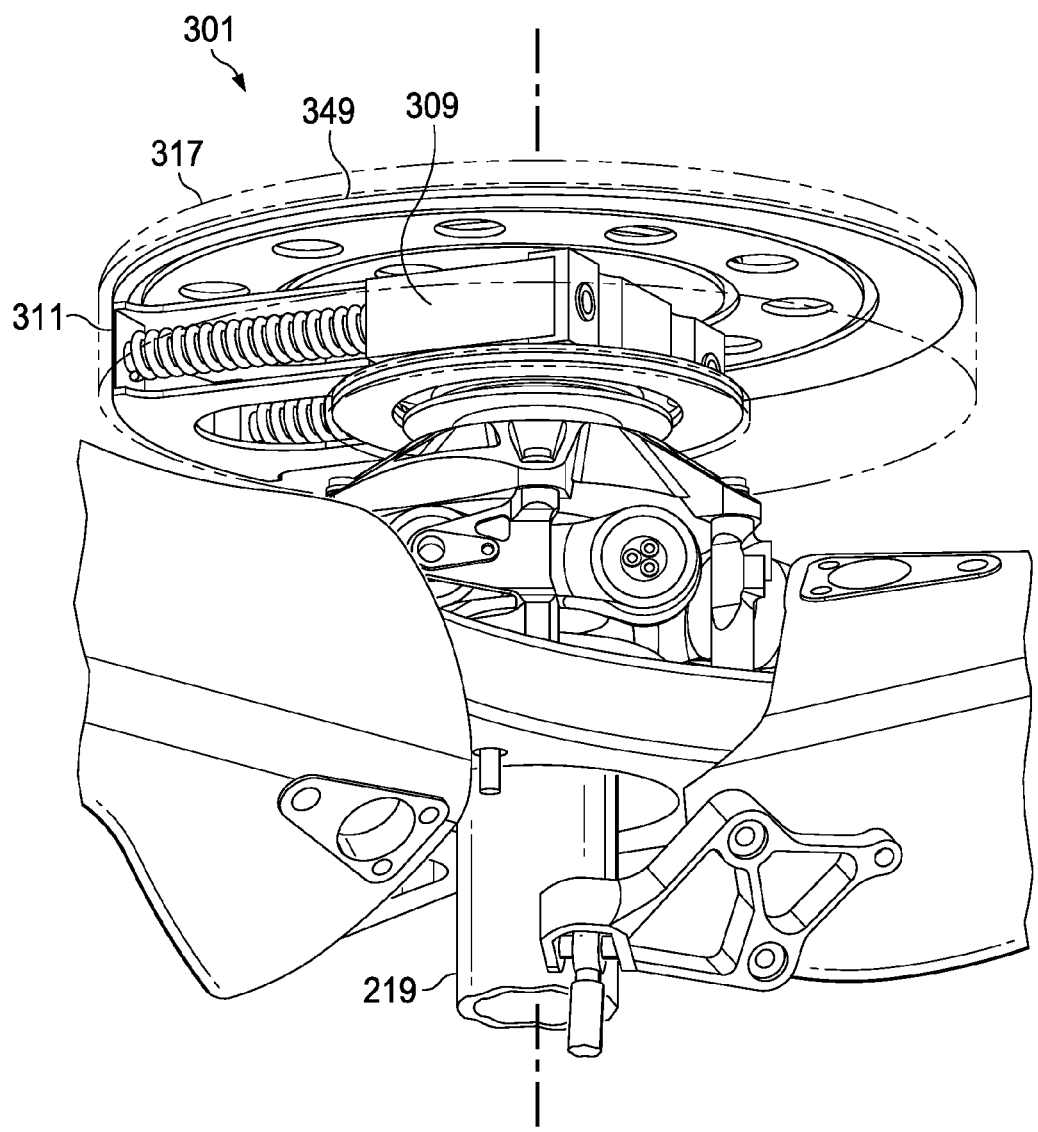
FIG. 12 shows a lower-perspective view of the vibration attenuation system shown in FIG. 11.

FIG. 6 shows proprotor 213 with weight 309 at an inner position for little or no force output with the support 311 and tracks 313 removed for clarity. FIGS. 9 and 10 show proprotor 213 with weight 309 at an outer position.

Figure 7:
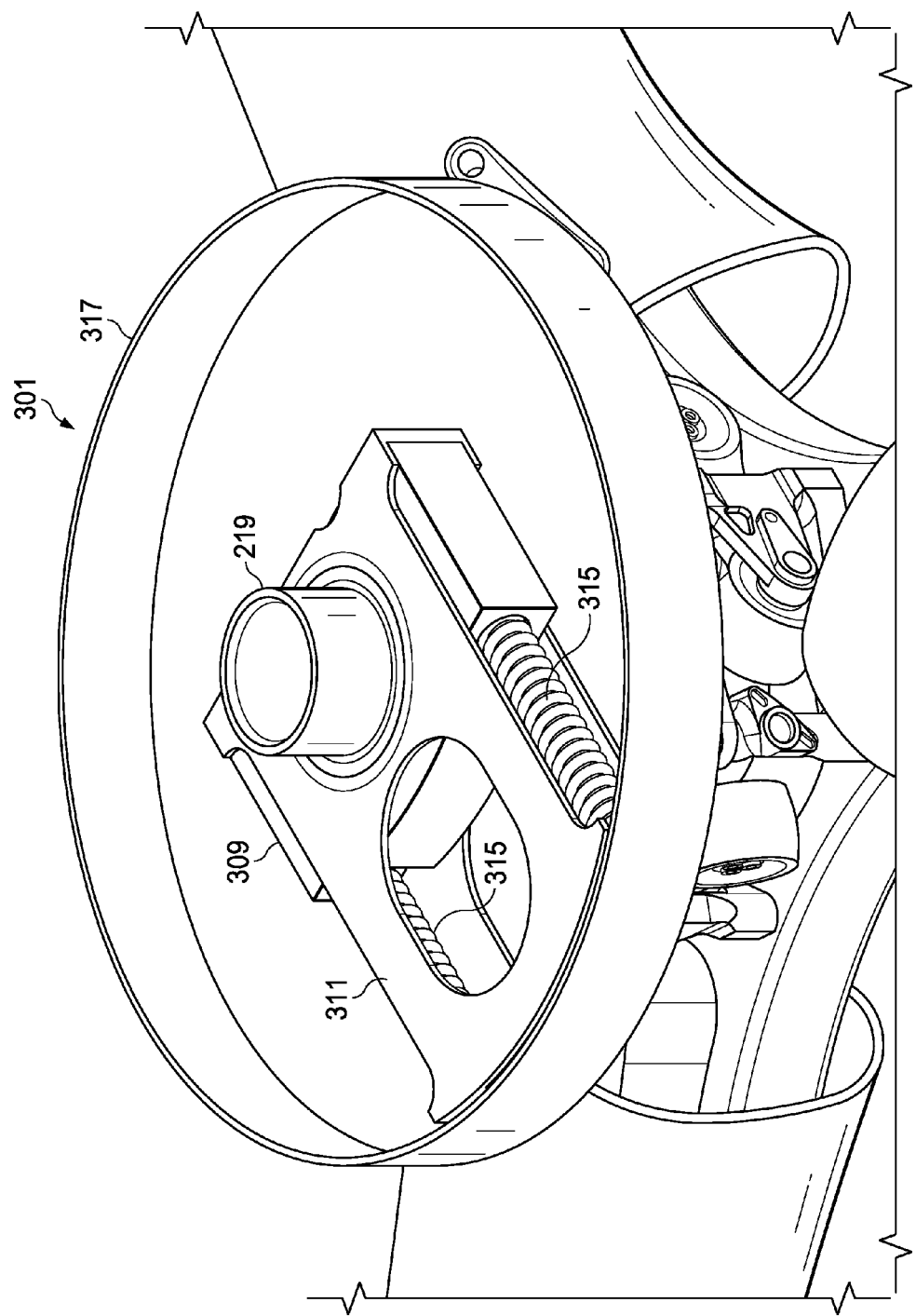
FIGS. 7 and 8 show enlarged views of the vibration attenuation system shown in FIG. 3, but with portions of components thereof removed for clarity and with the weight thereof at an inner position.

FIG. 7 shows an enlarged view of the vibration attenuation assembly 301 with a portion of the support 311 removed for clarity. The support 311 resides within a housing 317 that is fixed to rotate with the mast 219. The entire housing 317 is shown in FIG. 4, but the top of the housing 317 is removed in FIG. 7 for clarity.

Figure 8:
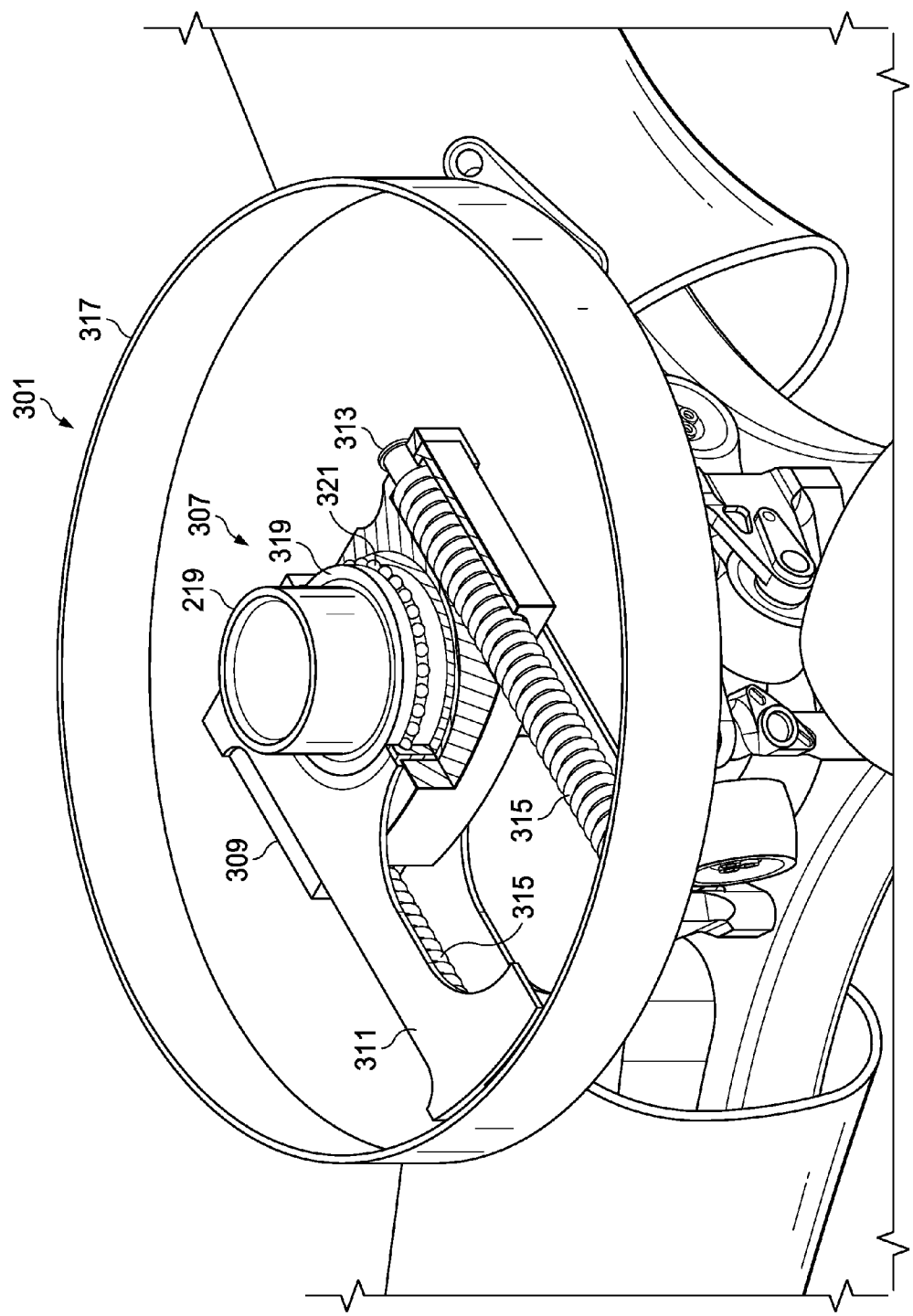

FIG. 8 shows an additional cut-away view of the support 311, showing an inner race 319 that is fixed to the mast 219, and bearings 321 that interpose the inner race 319 and the support 311. The race 319 and bearings 321 allow the weight assembly 307 to rotate freely about the mast 219. The weight assembly 307 is therefore free to orbit in response to the N/REV mast vibrations, which is a higher rotational frequency than the 1/REV rotational motion of the mast 219, while the weight 309 self-positions against the urging of the springs 315 between the inner and outer radial positions, resulting in a steady state extension and contraction motion in the spring length that serve to position the weight 309 creating a vibration that attenuates the N/REV vibrations in the mast 219.

FIGS. 9 and 10 show additional cut-away views of the vibration attenuation assembly 301 with weight 309 at an outer position which generates the maximum N/REV counter force in the weight system.

Turning next to FIGS. 11-14, in some embodiments, a control system 343 can be provided on the aircraft for controlling the parameters of operation of vibration attenuator 301, including the positioning of weight 309, speed of rotation, direction of rotation, and phasing of the shear forces relative to the position of the rotor and mast.

The control system 343 can be a microprocessor-based control system located, for example, in the fuselage. The control system 343 preferably comprises one or more feedback sensors, such as feedback sensors 345 located on the aircraft, such as on the hub, yoke, mast, fuselage, crew seats, wings, and/or nacelles, to provide vibration feedback data. Use of feedback sensors 345 allows control system 343 to control the operation of vibration attenuator system 301 based on measurements of vibrations transmitted into and through the airframe. This allows the system to reduce the resultant aircraft vibration rather than just minimizing the hub vibration. Changing the net magnitude and phase of the N/REV vibrations in the mast can create a counter vibration that when combined with the vibrations at other locations results in the desired global vibration treatment. Control system 343 may alternatively control operation of vibration attenuator 301 based on other data, such as airspeed, rotor speed, blade pitch angle, nacelle angle, amount of rotor thrust, and/or similar parameters.

Figure 13:
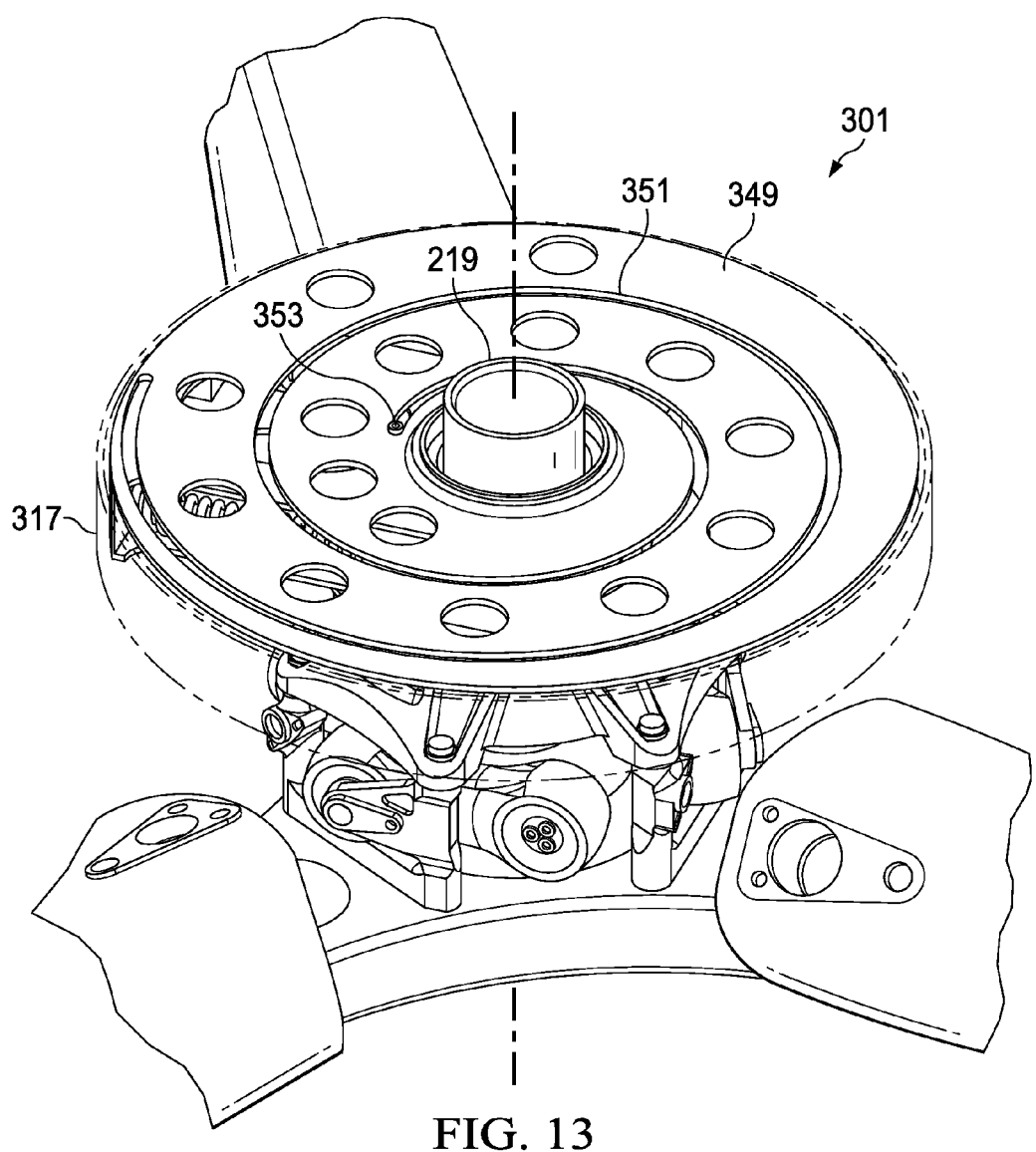
FIG. 13 shows an enlarged view of the vibration attenuation system shown in FIG. 11, but with components thereof removed for clarity.
Figure 14:
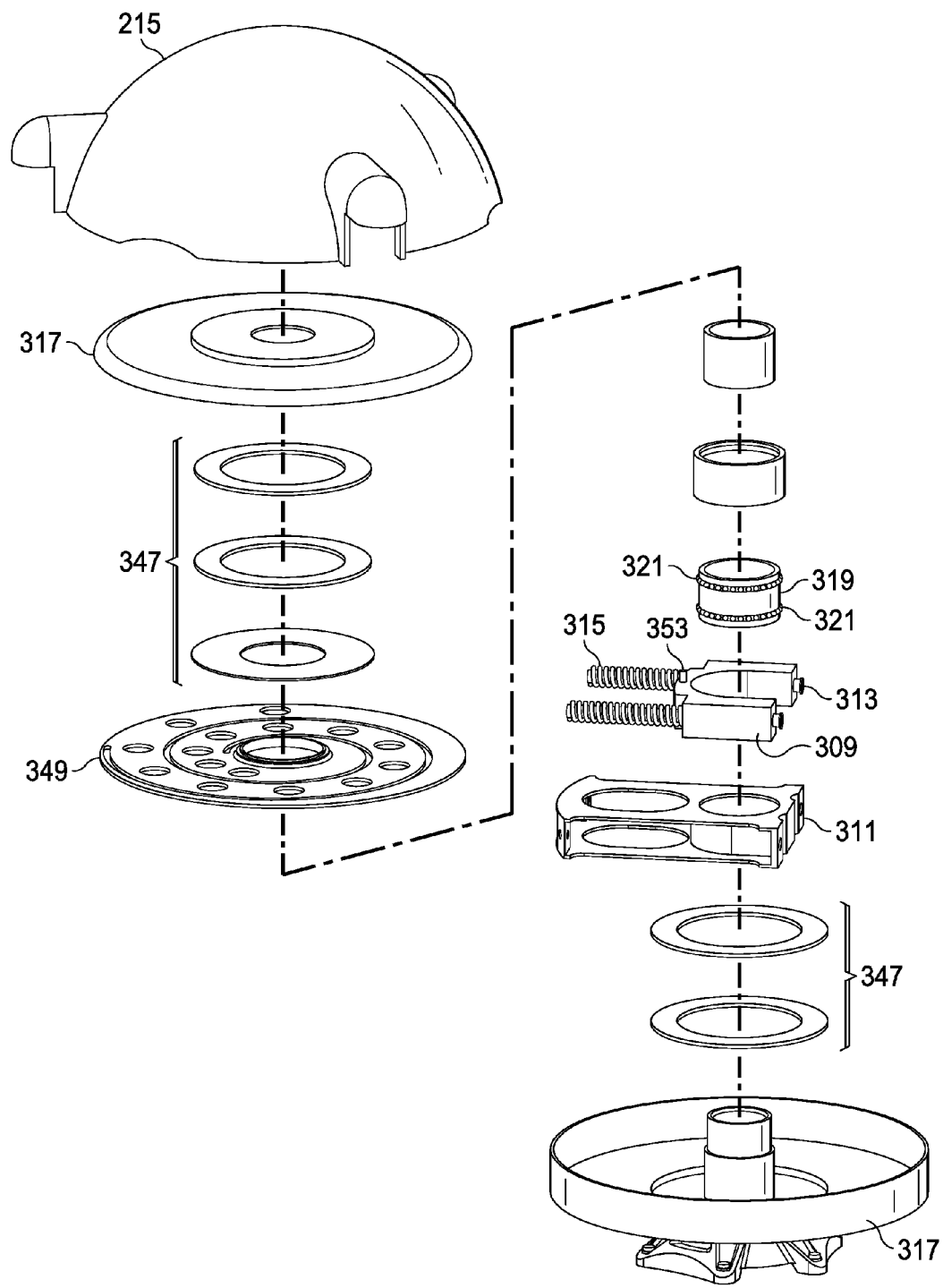
FIG. 14 shows an exploded view of the vibration attenuation system shown in FIG. 11.

Operational control preferably includes controlling the radial position of the weight 309 between the inner and outer positions in order to counteract vibrations in the mast 219. Control system 343 provides control signals to motor 347, which in turn drives the rotational position of slotted disk 349. The slotted disk 349 includes a spiraling slot 351. As shown in FIG. 13, where the motor 347 is not shown for clarity, the pin 353, which is fixed to the weight 309, extends from the weight 309 towards the disk 349 and into the slot 351. Thus, as the motor 347 rotates the disk 349, the radial position of the pin 353 and the weight 309 is changed relative to the mast 219. Motor 347 drives the angular phase position of frame 311 relative to the mast and drives the angular position of plate 349 to determine the angular position and radius of the weight 309 relative to the mast 219 to create the counter N/REV vibration.

Control system 343 and/or vibration attenuator 301 may be provided with "fail-off" features to prevent vibration attenuator 301 from inducing unintended and undesirable vibrations in the event of failure of one or more components of the vibration attenuation system. If the radial position of the weight 309 is jammed in an undesired position the motor that spins frame 311 can turn the weight at −1/rev which will cause the weight 309 to stop moving relative to the airframe which will make the counter vibration output to go to zero. If the motor that turns frame 311 fails, the weight 309 can be moved by motor 347 on plate 349 to the most inward position, which reduces the counter vibration to zero. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 301 means that attenuator 301 is less susceptible to transients, such as gusts, than prior UREKA systems and is not dependent on the dynamic characteristics of the mast. Also, since the vibration attenuator 301 can be proportionally self-exciting as described above in connection with FIGS. 3-10, the self-exciting mode can be engaged in the event of a failure in the control system 343; similarly, the control system 343 can be used in the event of a failure in the self-excitation mode of the vibration attenuator 301.

Turning next to FIGS. 15-18, an alternative embodiment is shown of a vibration attenuator 401. From a theoretical standpoint, the vibration attenuator 401 operates to attenuate vibrations in the mast 219 in a manner similar to that described in connection with vibration attenuator 301. Like the vibration attenuator 301, the vibration attenuator 401 is disposed within a housing 317 that is fixed to the mast 219, and therefore rotates with the mast 219. Also like the vibration attenuator 301, the vibration attenuator 401 includes a resultant weight and spring rate that can rotate relative to the mast 219 for countering vibrations in the mast 219; however, unlike the vibration attenuator 301, the vibration attenuator 401 includes plural weights: weight assemblies 403 and 405. Each of the weight assemblies 403 and 405 is associated with a respective one of torsion springs 407 and 409, which urge the weight assemblies toward the positions shown in FIG. 15.

Also, the weight assemblies 403 and 405 include a mechanical interconnecting mechanism so that each weight assembly receives feedback regarding the position of the other weight, and the rotational motion of each weight takes into account the activity of the other weight. The weight assemblies 403 and 405 along with springs 407 and track 413 create a system functions like the weight 309 and the springs 315 in vibration attenuation assembly 301. In the illustrated embodiment, each of the weight assemblies 403 and 405 includes a respective extension portion 410 and 411, and a respective guide slot 413 and 415. The extension portion 410 extends between the mast 219 and an armature 423. The extension portion 411 extends between the mast 219 and an armature 425. The armature 423 is fixed to the weight assembly 403 and extends to and into the guide slot 415 of the weight assembly 405, and the armature 425 is fixed to the weight assembly 405 and extends to and into the guide slot 413 of the weight assembly 403.

The armature 423 is rotatable relative to the extension portion 410, and the armature 425 is rotatable relative to the extension portion 411. However, the spring 407 urges the armature 423 to rotate in a first direction relative to the extension portion 410, where the first direction is counter-clockwise in the top-down view shown in FIG. 15. Also, the spring 409 urges the armature 425 to rotate in a second direction relative to the extension portion 411, where the second direction is clockwise in the top-down view shown in FIG. 15. Thus, the springs 407 and 409 both urge the distal ends of respective armatures 423 and 425 towards the mast 219. The guide slots 413 and 415 each define arc-shaped paths that extend between a first end that is relatively closer to the mast 219 and a second end that is relatively further from the mast 219. Thus, since the armatures 423 and 425 have fixed lengths, the rotation of the armature 423 relative to the extension portion 410 causes the second weight assembly 405 to rotate about the mast 219, and similarly the rotation of the armature 425 relative to the extension portion 411 causes the first weight assembly 403 to rotate about the mast 219. In this way, the weight assemblies 403 and 405 are mechanically linked by the armatures 423 and 425.

The weight assemblies 403 and 405 are free to orbit at N/REV, which can be a higher rotational frequency than the 1/REV motion of the mast 219. As the weight assemblies 403 and 405 rotate about the mast 219, the weight assemblies 403 and 405 will tend to position themselves as vibrations occur in the mast 219 against the urging of the springs 407 and 409 between the position shown in FIG. 15, where the two weights are about 180 degrees apart from each other, and the position shown in FIG. 18, where the two weights are somewhat aligned with each other, resulting in oscillatory extension and contraction motions in the spring length that serve to attenuate vibrations in the mast 219.

In some embodiments, a control system such as control system 343 described above can be provided on the aircraft for controlling the parameters of operation of vibration attenuator 401, including the positioning of weight assemblies 403 and 405, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 401 based on measurements of vibrations transmitted into and through the airframe. Control system 343 may alternatively control operation of vibration attenuator 401 based on other data, such as airspeed, rotor speed, blade pitch angle, nacelle angle, amount of rotor thrust, and/or similar parameters.

Figure 15:
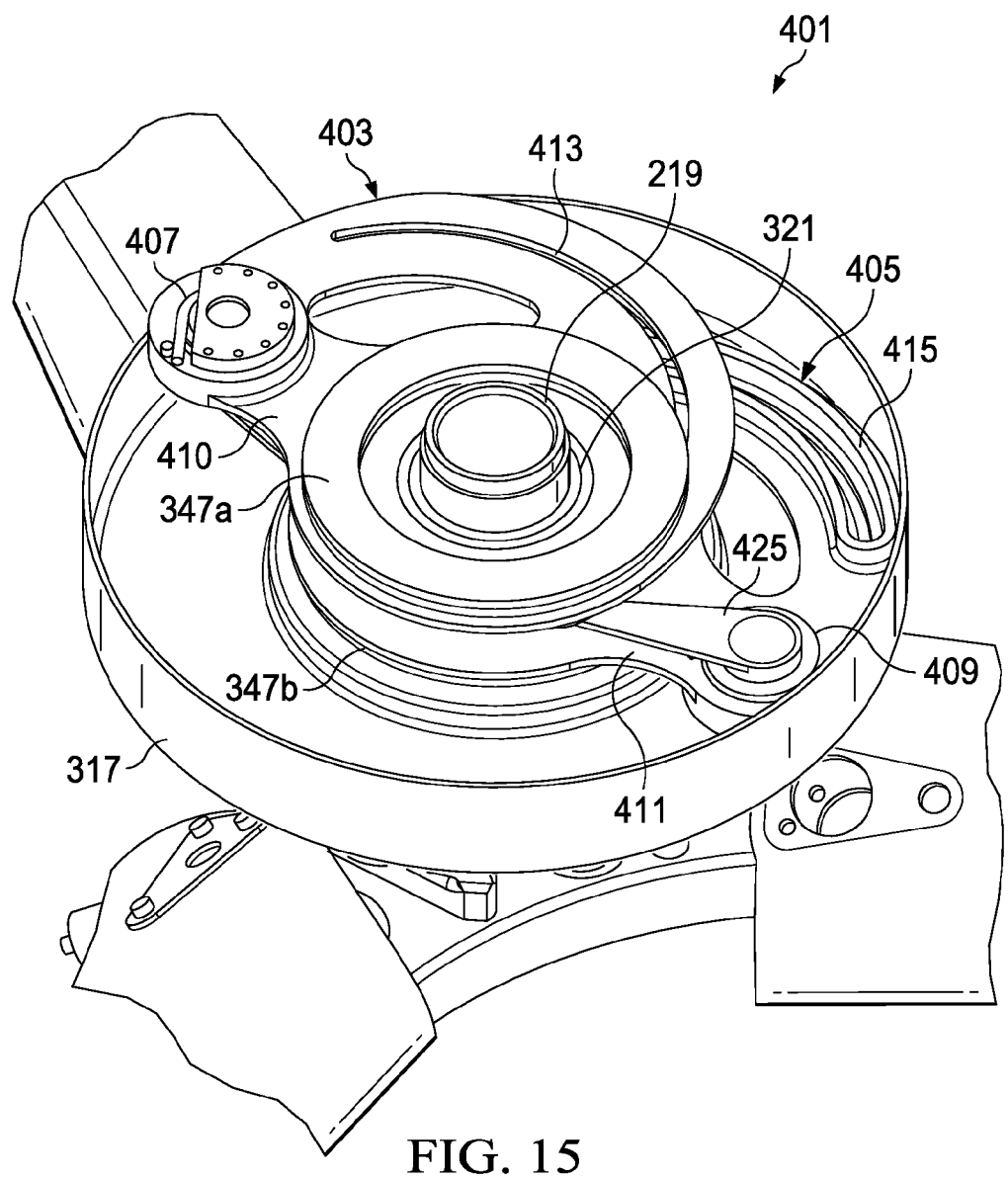
FIG. 15 shows an isolated, upper-perspective view of a portion of a proprotor assembly that includes an alternative embodiment of a vibration attenuation system according to the present disclosure.
Figure 16:
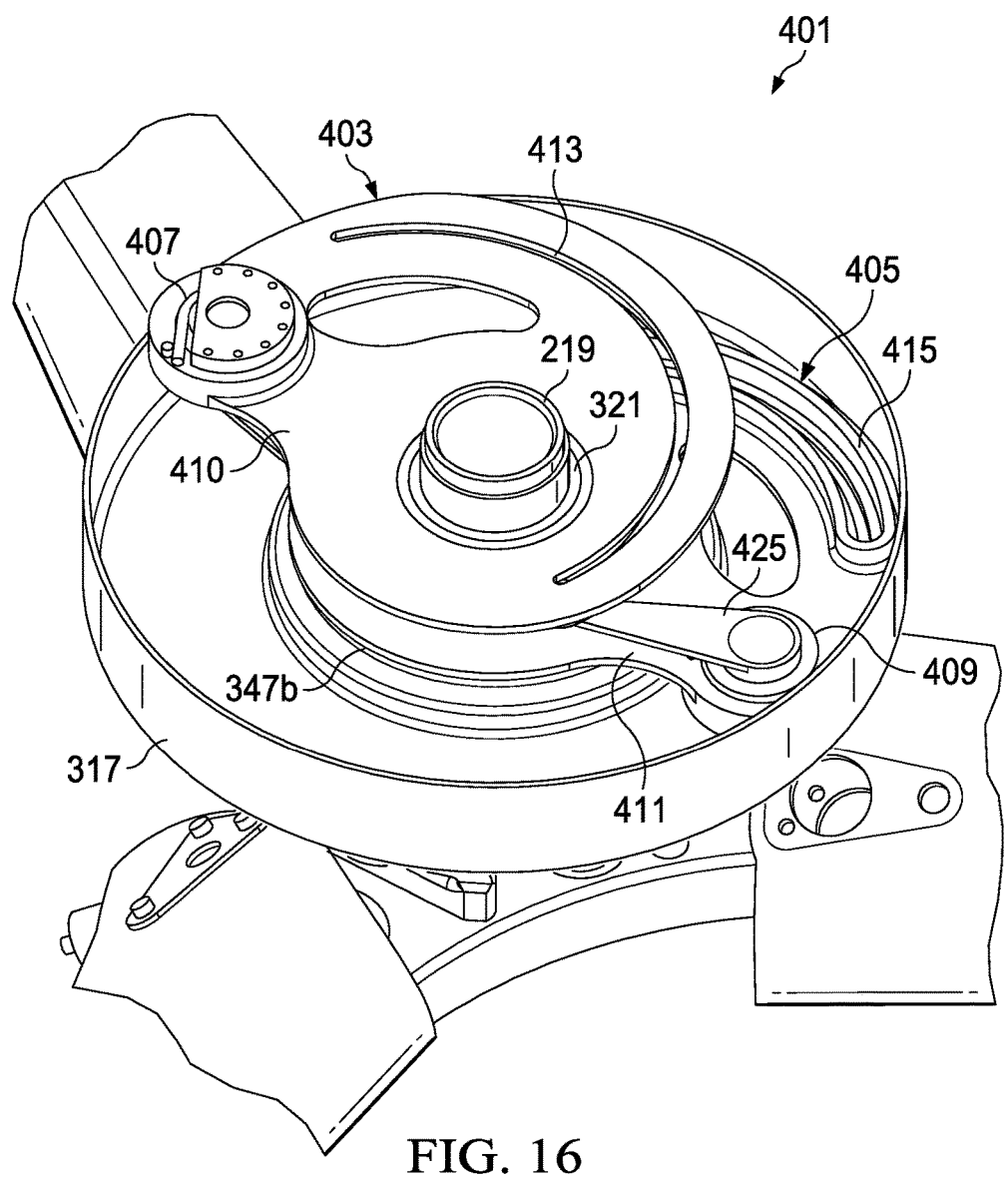
FIGS. 16-18 show an enlarged views of the vibration attenuation system shown in FIG. 15, but with components thereof removed for clarity.
Figure 17:
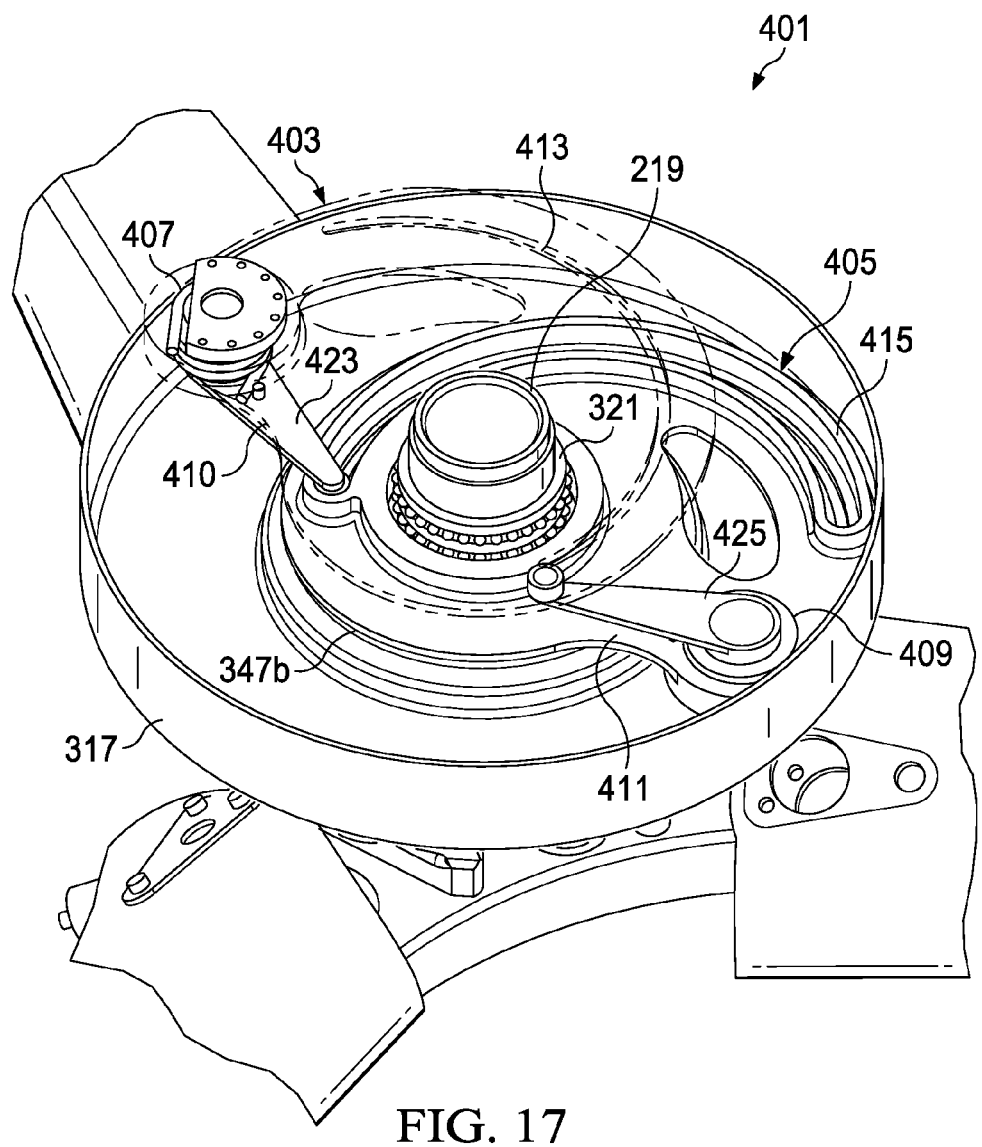
Figure 18:
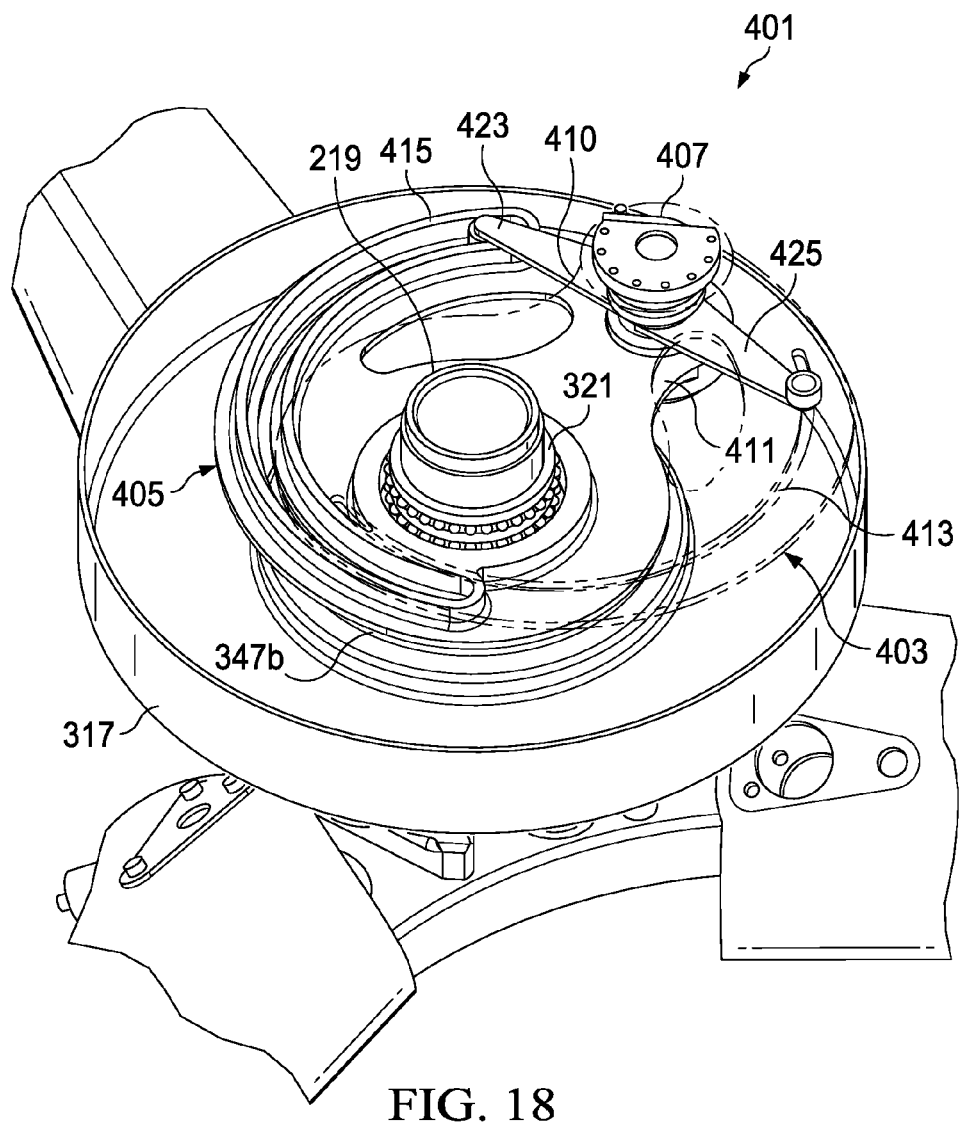
Figure 19:
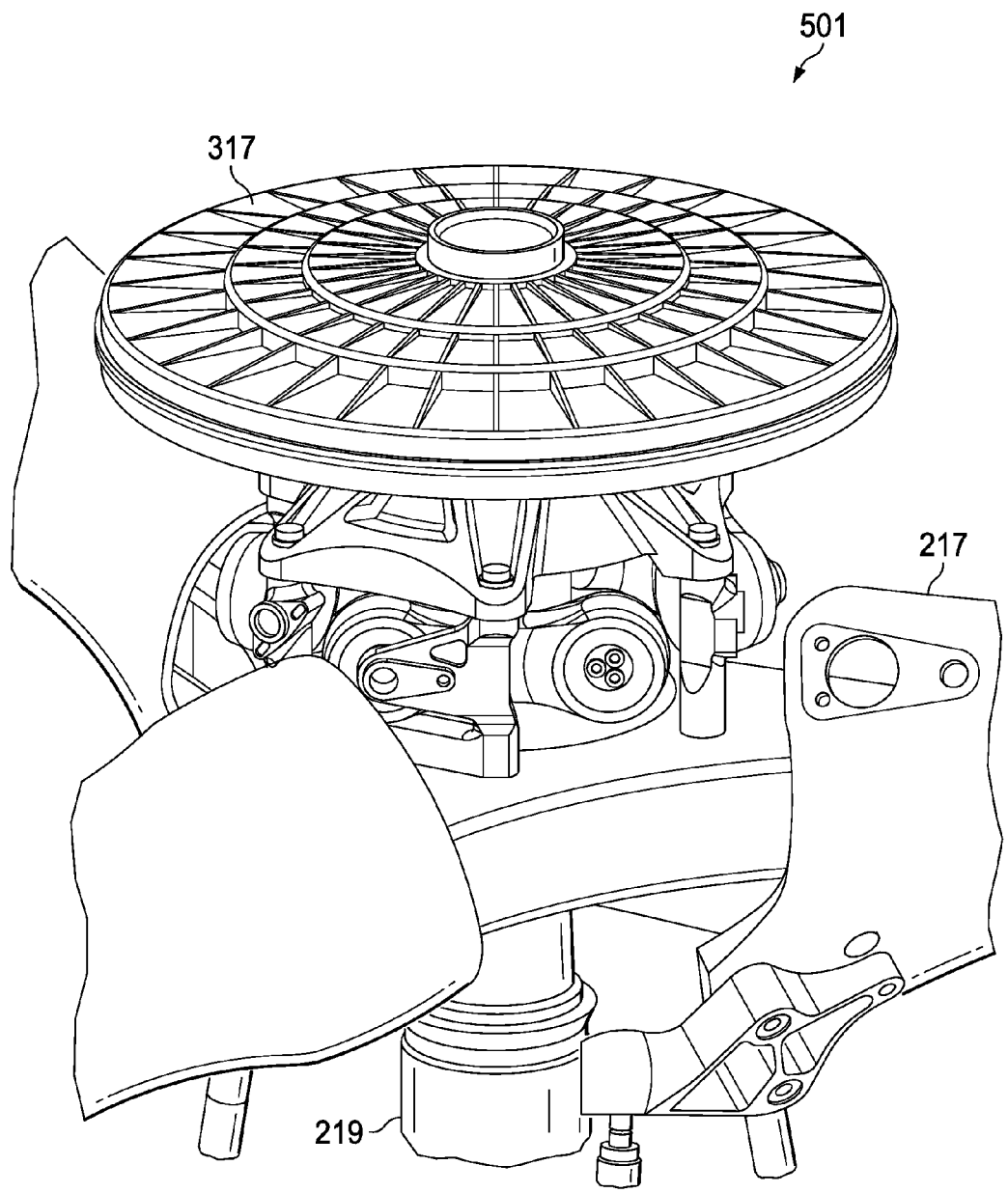
FIG. 19 shows an isolated, upper-perspective view of a portion of a proprotor assembly that includes an alternative embodiment of a vibration attenuation system according to the present disclosure.
Figure 20:
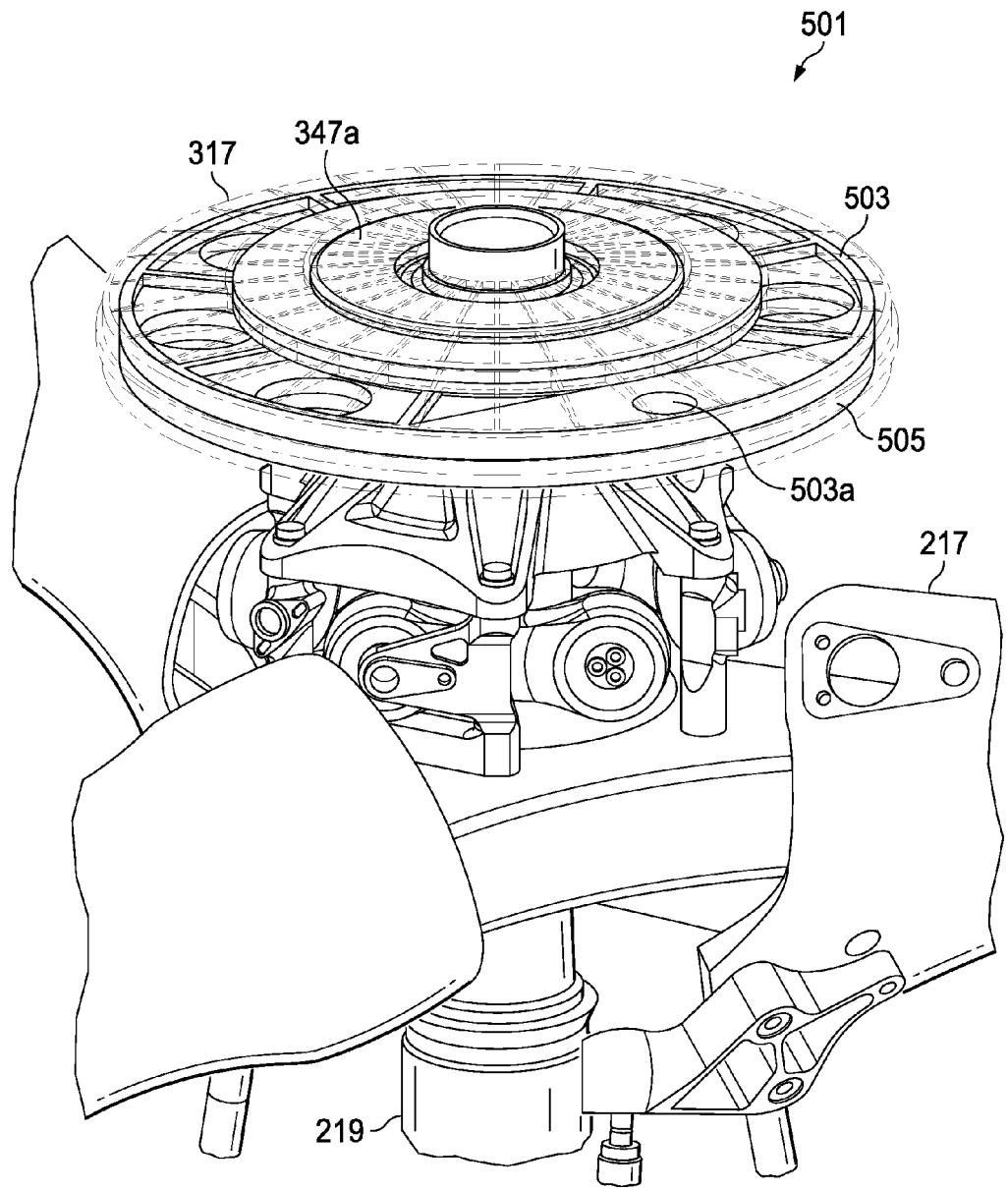
FIG. 20 shows an enlarged view of the vibration attenuation system shown in FIG. 19, but with components thereof removed for clarity.
Figure 21:
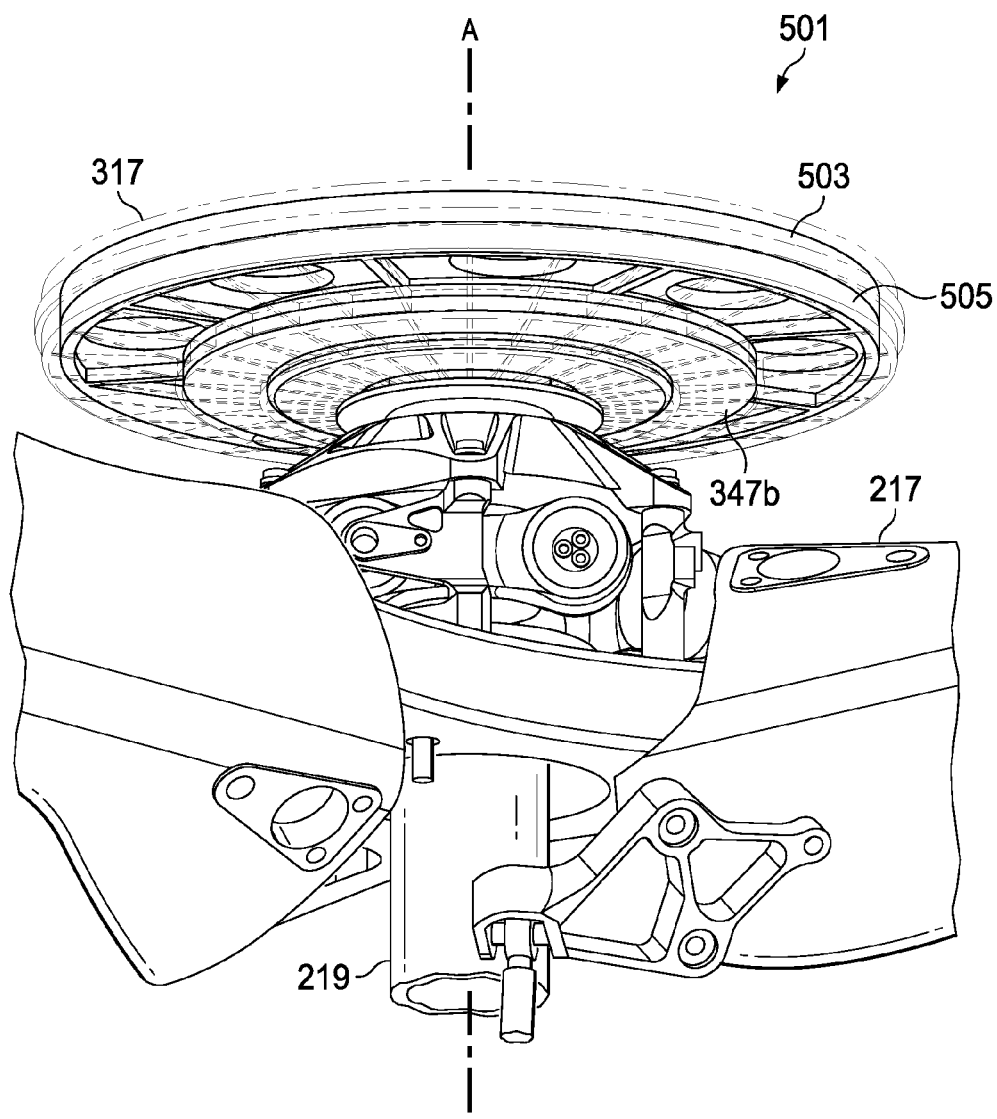
FIG. 21 shows a lower-perspective view of the vibration attenuation system shown in FIG. 19, but with components thereof removed for clarity.
Figure 22:
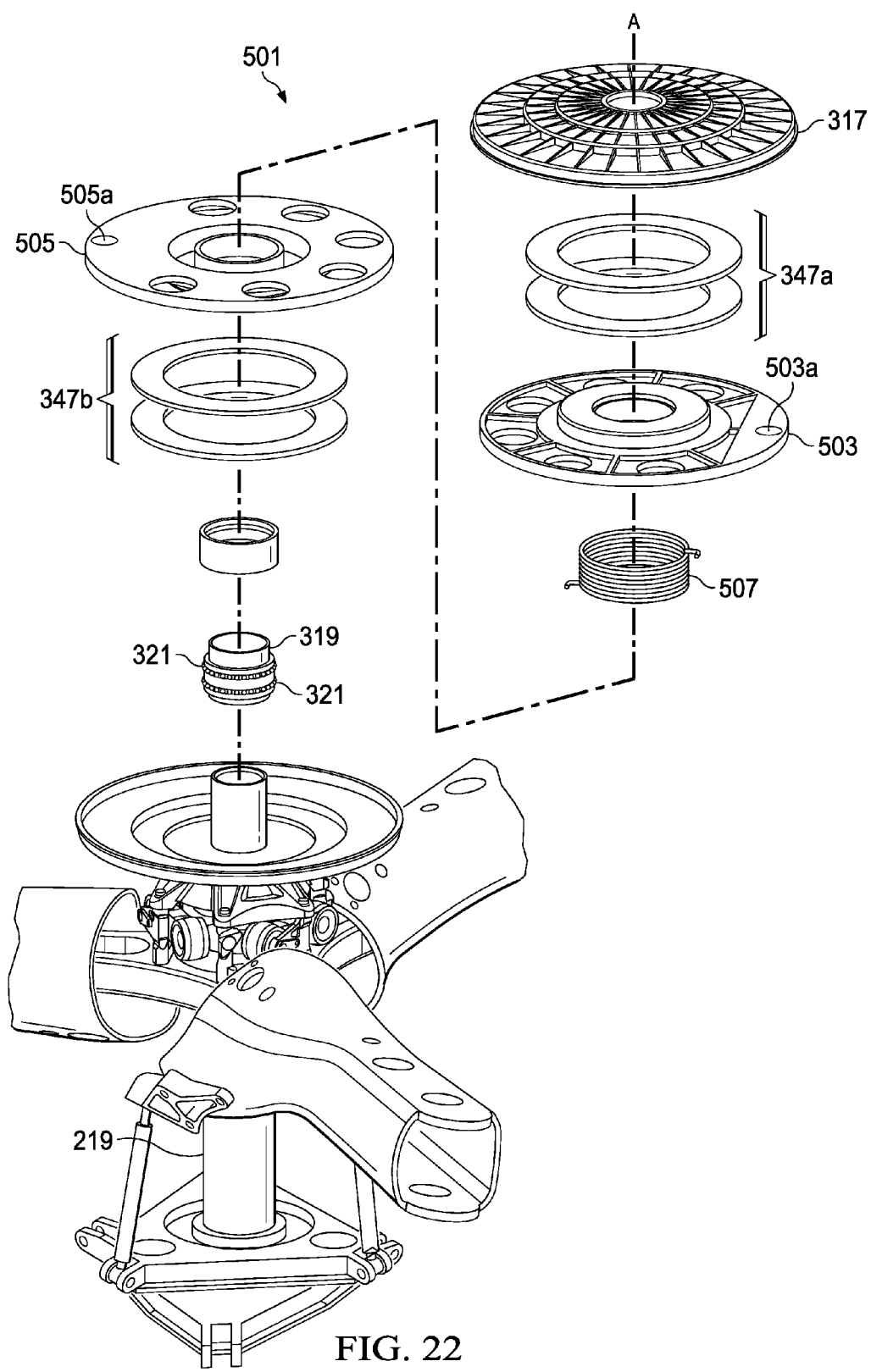
FIG. 22 shows an exploded view of the vibration attenuation system shown in FIG. 19.

Operational control preferably includes controlling the relative positions of the weight assemblies 403 and 405 between the positions shown in FIGS. 15 and 18 in order to counteract vibrations in the mast 219. Control system 343 provides control signals to motors 347a and 347b, which in turn drive the rotational positions of the weight assemblies 403 and 405, respectively.

Control system 343 and/or vibration attenuator 401 may be provided with "fail-off" features to prevent vibration attenuator 401 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 401 means that attenuator 401 is less susceptible to transients, such as gusts, than prior UREKA systems and is not dependent on the dynamic characteristics of the mast. Also, since the vibration attenuator 401 can be proportionally self-exciting as described above, the self-exciting mode can be engaged in the event of a failure in the control system 343; similarly, the control system 343 can be used in the event of a failure in the self-excitation mode of the vibration attenuator 401.

Turning next to FIGS. 19-22, an alternative embodiment is shown of a vibration attenuator 501. From a theoretical standpoint, the vibration attenuator 501 operates to attenuate vibrations in the mast 219 in a manner similar to that described in connection with vibration attenuator 301. Like the vibration attenuator 301, the vibration attenuator 501 is disposed within a housing 317 that is fixed to the mast 219, and therefore rotates with the mast 219. Also like the vibration attenuator 301, the vibration attenuator 501 includes weight that can rotate relative to the mast 219 for countering vibrations in the mast 219; however, unlike the vibration attenuator 301, the vibration attenuator 501 includes plural weights: weight assemblies 503 and 505. Each of the weight assemblies 503 and 505 includes a respective disk-shaped body having a respective concentrated mass region 503a and 505a. The weight assemblies 503 and 505 are both attached to a torsion spring 507, which urges the weight assemblies 503 and 505 toward the positions shown in FIG. 22 where the concentrated mass regions 503a and 505a are 180 degrees apart about the rotational axis A of the mast 219. The spring 507 is preferably selected such that its torsional spring rate can be overcome by self-excitation of the weight assemblies 503 and 505, but the weight assemblies 503 and 505 are still affected by the urging of the spring 507 toward the neutral position.

A control system such as control system 343 described above can be provided on the aircraft for controlling the parameters of operation of vibration attenuator 501, including the positioning of weights 503 and 505, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 501 based on measurements of vibrations transmitted into and through the airframe. Control system 343 may alternatively control operation of vibration attenuator 501 based on other data, such as airspeed, rotor speed, blade pitch angle, nacelle angle, amount of rotor thrust, and/or similar parameters.

Operational control preferably includes controlling the relative positions of the weights 503 and 505 in order to counteract vibrations in the mast 219. Control system 343 provides control signals to motors 347a and 347b, which in turn drive the rotational positions of the weight assemblies 503 and 505, respectively.

The weight assemblies 503 and 505 are free to orbit at N/REV, which can be a higher rotational frequency than the 1/REV motion of the mast 219, while the weights 503 and 505 self-position themselves. While the mast 219 is rotating, vibrations in the mast 219 and the rotation of the mast 219 will cause the weight assemblies 503 and 505 to tend to rotate relative to each other such that the concentrated mass regions 503a and 505a are rotated toward each other when the N/REV mast vibration is at a frequency close to the spring mass tuning of the weight assemblies. Generally the weight assemblies 503 and 505 will rotate past a position that would be optimal for attenuating vibrations in the mast 219 due to the tuning of the spring mass system and the fact that the system functions over the 1/rev frequency. The motors 347a and 347b can be used to drive the weight assemblies 503 and 505 in rotation toward, or away from, neutral positions shown in FIG. 22, until the weight assemblies 503 and 505 are in at least somewhat optimal positions for attenuating vibrations in the mast 219. Since the spring 507 urges the weight assemblies 503 and 505 back toward the neutral positions unless influenced by the n/rev mast vibration of the mast, the spring 507 acts to assist the motors 347a and 347b in obtaining the optimal location for the weights relative to the n/rev vibration, thereby reducing the amount of work required of the motors 347a and 347b to adjust the rotational positions of the weight assemblies 503 and 505.

Control system 343 and/or vibration attenuator 501 may be provided with "fail-off" features to prevent vibration attenuator 501 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 501 means that attenuator 501 is less susceptible to transients, such as gusts, than prior systems and is not dependent on the dynamic characteristics of the mast. Also, since the vibration attenuator 501 can be self-exciting as described above, the self-exciting mode can be engaged in the event of a failure in the control system 343; similarly, the control system 343 can be used in the event of a failure in the self-excitation mode of the vibration attenuator 501.

Figure 23:
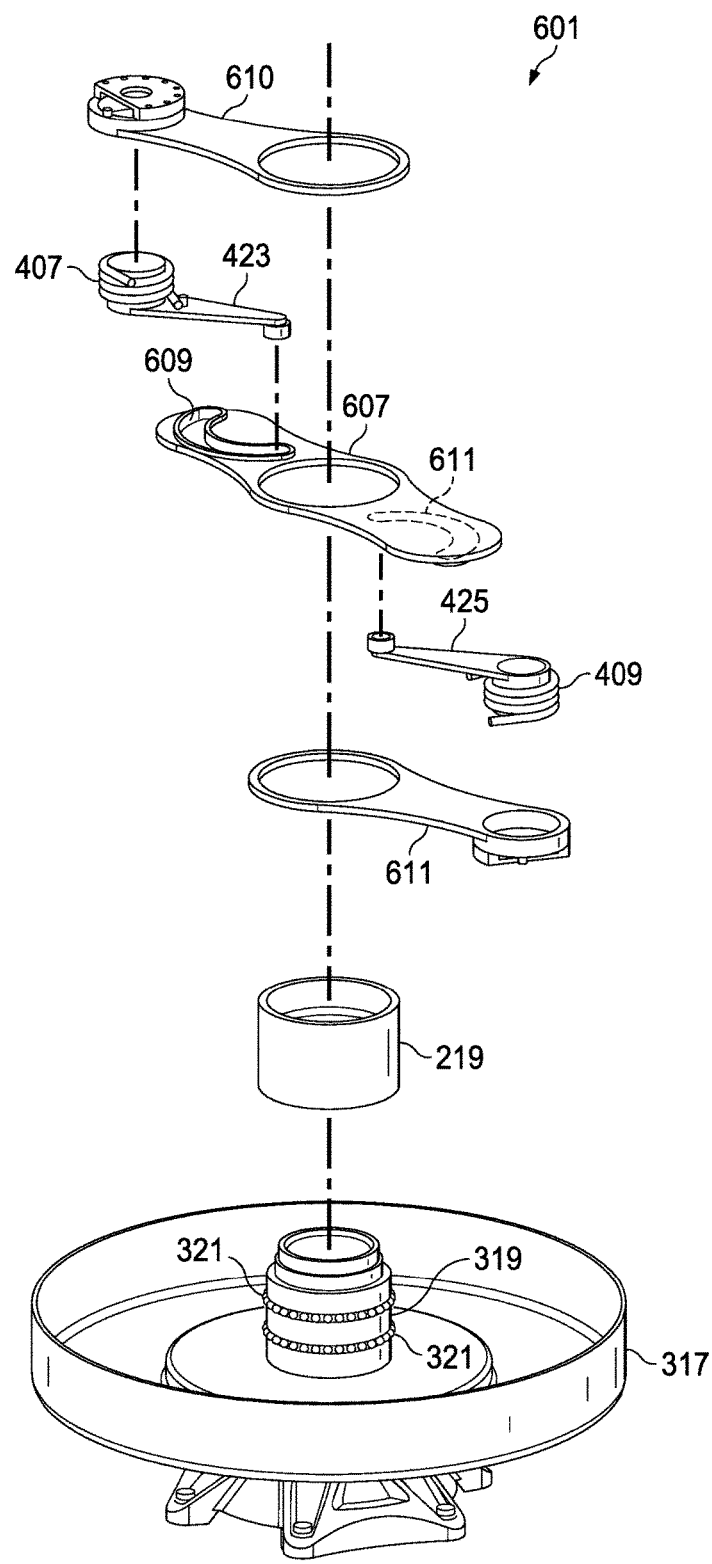
FIG. 23 shows an exploded view of an alternative embodiment of a vibration attenuation system according to the present disclosure.
Figure 24:
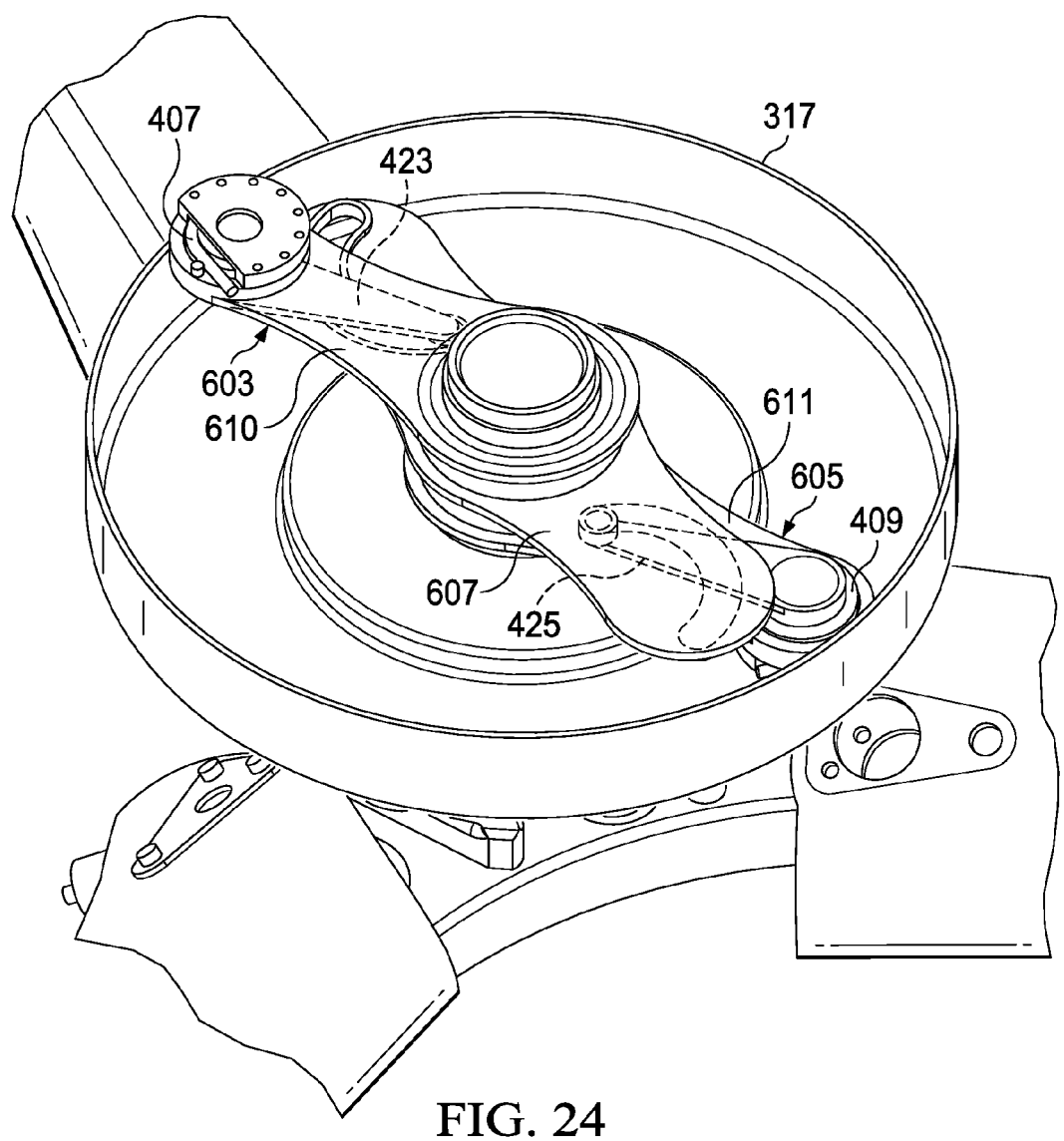
FIG. 24 shows an isolated, upper-perspective view of a portion of a proprotor assembly that includes the alternative embodiment of a vibration attenuation system shown in FIG. 23.

Turning next to FIGS. 23 and 24, an alternative embodiment is shown of a vibration attenuator 601. The vibration attenuator 601 is similar to the vibration attenuator 401 shown in FIGS. 15-18, except that the vibration attenuator 601 includes weight assemblies 603 and 605 and intermediate plate 607 in place of the weight assemblies 403 and 405 in vibration attenuator 401.

The weight assemblies 603 and 605 include a mechanical interconnecting mechanism so that each weight assembly receives feedback regarding the position of the other weight, and the rotational motion of each weight takes into account the activity of the other weight. In the illustrated embodiment, each of the weight assemblies 603 and 605 includes a respective extension portion 610 and 611, and the intermediate plate 607 includes a pair of guide slots 609 and 611 on opposing sides thereof. The extension portion 610 extends between the mast 219 and an armature 423. The extension portion 611 extends between the mast 219 and an armature 425. The armature 423 is fixed to the weight assembly 603 and extends to and into the guide slot 609 of the intermediate plate 607, and the armature 425 is fixed to the weight assembly 605 and extends to and into the guide slot 611 of the intermediate plate 607.

The armature 423 is rotatable relative to the extension portion 610, and the armature 425 is rotatable relative to the extension portion 611. However, the spring 407 urges the armature 423 to rotate in a first direction relative to the extension portion 610, where the first direction is counterclockwise in the top-down view shown in FIG. 24. Also, the spring 409 urges the armature 425 to rotate in a second direction relative to the extension portion 611, where the second direction is clockwise in the top-down view shown in FIG. 24. Thus, the springs 407 and 409 both urge the distal ends of respective armatures 423 and 425 towards the mast 219. The guide slots 609 and 611 each define optimal arc-shaped paths which create the desired spring rate curves that extend between a first end that is relatively closer to the mast 219 and a second end that is relatively further from the mast 219. Thus, since the armatures 423 and 425 have fixed lengths, the rotation of the armature 423 relative to the extension portion 610 causes the second weight assembly 605 to rotate about the mast 219, and similarly the rotation of the armature 425 relative to the extension portion 611 causes the first weight assembly 603 to rotate about the mast 219. In this way, the weight assemblies 603 and 605 are mechanically linked by the armatures 423 and 425 and intermediate plate 607.

The weight assemblies 603 and 605 are free to orbit at N/REV, which is a higher rotational frequency than the 1/REV motion of the mast 219. As the weight assemblies 603 and 605 rotate about the mast 219, the weight assemblies 603 and 605 will tend to position themselves as vibrations occur in the mast 219 against the urging of the springs 407 and 409 between the position shown in FIG. 24 where the two weights are about 180 degrees apart from each other, and a position similar to that shown in FIG. 18 where the two weights are somewhat aligned with each other, resulting in the maximum force to attenuate vibrations in the mast 219.

In some embodiments, a control system such as control system 343 described above can be provided on the aircraft for controlling the parameters of operation of vibration attenuator 601, including the positioning of weight assemblies 603 and 605, speed of rotation, direction of rotation, and phasing of the shear forces relative to the position of the rotor. As described above, the control system 343 can be a microprocessor-based control system located, for example, in the fuselage. The control system 343 preferably comprises feedback sensors, such as feedback sensors 345 located on the aircraft, such as on the fuselage, wings, and/or nacelles, to provide vibration feedback data. Use of feedback sensors 345 allows control system 343 to control the operation of vibration attenuator system 601 based on measurements of vibrations transmitted into and through the airframe. Control system 343 may alternatively control operation of vibration attenuator 401 based on other data, such as airspeed, rotor speed, blade pitch angle, nacelle angle, amount of rotor thrust, and/or similar parameters.

Operational control preferably includes controlling the relative positions of the weight assemblies 603 and 605 in order to counteract vibrations in the mast 219. Control system 343 provides control signals to motors, such as motors 347a and 347b shown in FIG. 15, which in turn drive the rotational positions of the weight assemblies 603 and 605, respectively.

Control system 343 and/or vibration attenuator 601 may be provided with "fail-off" features to prevent vibration attenuator 601 from inducing unintended and undesirable vibrations in the event of failure of one or more components of the vibration attenuation system. Inputs to control system may include aircraft gross weight, load factor, altitude, airspeed, and rpm. In addition, control system 343 may be optimized for use on tiltrotor aircraft 201 by also basing commands on the angle of nacelles 203 and other tiltrotor-specific parameters. Use of control system 343 to control vibration attenuator 601 means that attenuator 601 is less susceptible to transients, such as gusts, than prior UREKA systems and is not dependent on the dynamic characteristics of the mast. Also, since the vibration attenuator 601 can be self-exciting as described above, the self-exciting mode can be engaged in the event of a failure in the control system 343; similarly, the control system 343 can be used in the event of a failure in the self-excitation mode of the vibration attenuator 601.

Thus, like vibration attenuator 401, the vibration attenuator 601 operates to attenuate vibrations in the mast 219 in a manner similar to that described in connection with vibration attenuator 301. Like the vibration attenuator 301, the vibration attenuator 601 is disposed within a housing 317 that is fixed to the mast 219, and therefore rotates with the mast 219. Also like the vibration attenuator 301, the vibration attenuator 601 includes weight that can rotate relative to the mast 219 for countering vibrations in the mast 219; however, unlike the vibration attenuator 301, the vibration attenuator 601 includes plural weights—weight assemblies 603 and 605—that are each associated with a respective one of torsion springs 407 and 409, which urge the weight assemblies 603 and 605 toward the positions shown in FIG. 24.

The vibration attenuation system described herein can be implemented in still further embodiments. Some embodiments, can be limited to a totally passive system that includes a radial spring-mass system attached to a rotor hub such that the mass is free to spin in reaction to the rotation of the hub and vibrations in the hub. In some such embodiments the mass can be free to spin N/REV which is above 1/REV of the mast; in alternative embodiments, the mass can be configured to spin up to close to the frequency of the spinning of the mast. In some embodiments, the system can include motors or the like to influence the spinning of the mass, such as the frequency and phase of the spinning, based on inputs received from a control system, which in turn can be configured to provide such inputs based on inputs received from one or more sensors. In some embodiments, a device such as an actuator can be provided for influencing the spring rate of the spring-mass system. In some embodiments, a device such as an actuator can be provided to adjust the radius of the mass of the spring-mass system. In some embodiments, the vibration attenuation system can be mounted on a stand pipe or the like that does not spin with the mast and does not require a slip-ring or the like for wiring to and from the vibration attenuation system. In some embodiments, the vibration attenuation system can be mounted on the yoke or Hub so they are free to stay in the plane of the rotor as it flaps relative to the mast 219.

In any of the above-described embodiments, the spring-mass system can include two or more weights that both are free to rotate about the mast. In some such embodiments, the two or more weights of the spring-mass system can also be free to change phase relative to that of the spinning mast, thereby changing the effective radius of the total mass of the spring-mass system. Alternatively, some such embodiments can include one or more actuators or the like for influencing the spin of the two or more weights, such as the phase or effective radius of the weights, either by influencing both weights together or by influencing each weight independently one at a time.

Still further embodiments can include multiple sets of these devices to attenuate more than one n/rev frequency in the mast 219.

Still further embodiments can include a single spinning plate that is spun by a motor. One or more spring-assisted swing arms can be attached to the plate and can move either passively or by the action of a second motor to position the weights to achieve zero to maximum output for cancelling vibrations in the mast 219. In some such embodiments, the swing arms can pivot about an axis that is on the plate and is not coaxial to the center of rotation of the mast.

In some embodiments disclosed herein that include a motor, alternative means of actuating of the weight assembly's radial position can be used in addition to, or in place of, a motor that spins about the center of the mast. For example, an actuator can be used that pushes along the axis of rotation (parallel to the mast center line) or lateral shift.

In some embodiments, the shifting weight can include or be comprised of a mass that moves out of plane, or in a plane that in not normal to the axis A of the mast. For example, some embodiments can include a swing arm that swings out of plane from a revolving plate in order to position a weight for attenuating vibrations in the mast 219.

In some embodiments, the shifting weight can include or be comprised of a system of spinning masses with a hydraulic motor (either intermeshing gear motor or radial vain motor) with and without a spring to off load the force needed to spin the masses. The spinning masses can provide the positioning weight for attenuating vibrations in the mast 219.

Still further embodiments can include a fluid as the mass in a housing that uses a spring mechanism to position the fluid proportionally to the n/rev vibration in the mast 219.

Still further embodiments can include permanent magnets or electro magnets to provide the spring force that influences the location of the weights.

Any of the above-described embodiments can be implemented by replacing mechanical and/or electrical components shown in the drawings and described herein with fluid components. For example, the spring-mass system of the disclosed vibration attenuation system can be implemented entirely as a fluid system or as a combination of a fluid and mechanical system, or as a combination of a fluid, mechanical, and/or electrical system.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A vibration isolation system for a rotary-wing aircraft main rotor system having a mast that is rotatable about an axis of rotation, the vibration isolation system comprising:
    a first mass attached to the mast and rotatable relative to the mast coaxially about said axis of rotation, the first mass including a first weight assembly having a first extension portion extending in a radial direction from the mast towards a distal end of the first weight assembly; and
    a second mass attached to the mast and rotatable relative to the mast and the first mass coaxially about said axis of rotation, the second mass including a second weight assembly having a second extension portion extending in a radial direction from the mast towards a distal end of the second weight assembly;

wherein the first weight assembly is mechanically linked to the second weight assembly and includes a spring for urging the positioning of the first weight assembly; and wherein the angular velocity of the first and second masses is operable to reduce in-plane vibration of said main rotor system.

2. The system of claim 1, wherein the first weight assembly includes a first armature rotationally attached to the distal end of the first weight assembly.

3. The system of claim 2, wherein the second weight assembly defines a guide slot, and wherein the first armature mechanically links the extension portion of the first weight assembly to the guide slot of the second weight assembly.

4. The system of claim 3, wherein the guide slot includes an arc-shaped slot that extends between a first end thereof that is relatively closer to the mast than a second end thereof, wherein the slot is shaped so as to adjust an effective spring rate of the second weight assembly in the radial direction.

5. The system of claim 2, wherein the first weight assembly further includes a first torsion spring attached to the distal end of the first weight assembly and configured for urging the first armature in a first direction relative to the first extension portion.

6. The system of claim 5, wherein the first torsion spring urges the first armature to extend from the distal end of the first weight assembly towards the mast.

7. The system of claim 2, wherein the second weight assembly includes a second armature for mechanically linking the second weight assembly to the first weight assembly.

8. An aircraft comprising:
a rotary-wing aircraft main rotor system having a mast that is rotatable about an axis of rotation;
a vibration isolation system comprising:
a first mass attached to the mast and rotatable relative to the mast coaxially about said axis of rotation, the first mass including a first weight assembly having a first extension portion extending in a radial direction from the mast towards a distal end of the first weight assembly; and
a second mass attached to the mast and rotatable relative to the mast and the first mass coaxially about said axis of rotation, the second mass including a second weight assembly having a second extension portion extending in a radial direction from the mast towards a distal end of the second weight assembly;
wherein the first weight assembly includes a first armature rotationally attached to the distal end of the first weight assembly;
wherein the second mass is mechanically linked to the first mass, and
wherein the angular velocity of the first and second masses is operable to reduce in-plane vibration of said main rotor system.

9. The aircraft of claim 8, wherein the second weight assembly defines a guide slot, and wherein the first armature mechanically links the extension portion of the first weight assembly to the guide slot of the second weight assembly.

10. The aircraft of claim 9, wherein the guide slot includes an arc-shaped slot that extends between a first end thereof that is relatively closer to the mast than a second end thereof.

11. The aircraft of claim 8, wherein the first weight assembly further includes a first torsion spring attached to the distal end of the first weight assembly and configured for urging the first armature in a first direction relative to the first extension portion.

12. The aircraft of claim 11, wherein the first torsion spring urges the first armature to extend from the distal end of the first weight assembly towards the mast.

13. The aircraft of claim 8, wherein the second weight assembly includes a second armature for mechanically linking the second weight assembly to the first weight assembly.

* * * * *